US012659938B2

(12) United States Patent
Li et al.

(10) Patent No.: US 12,659,938 B2
(45) Date of Patent: Jun. 16, 2026

(54) METHOD AND APPARATUS FOR DETERMINING CONTROL RESOURCES BASED ON COMMON SIGNAL INDICATION INFORMATION

(71) Applicant: HUAWEI TECHNOLOGIES CO., LTD., Shenzhen (CN)

(72) Inventors: Shengyu Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/468,870

(22) Filed: Sep. 18, 2023

(65) Prior Publication Data

US 2024/0008014 A1     Jan. 4, 2024

Related U.S. Application Data

(63) Continuation of application No. PCT/CN2022/081781, filed on Mar. 18, 2022.

(30) Foreign Application Priority Data

Mar. 19, 2021     (CN) ......................... 202110297106.2

(51) Int. Cl.
*H04W 56/00*          (2009.01)
*H04W 72/0453*     (2023.01)
*H04W 72/232*       (2023.01)

(52) U.S. Cl.
CPC ..... *H04W 72/0453* (2013.01); *H04W 72/232* (2023.01)

(58) Field of Classification Search
CPC ... H04L 5/0048; H04L 5/0023; H04L 5/0053; H04L 27/2656; H04W 56/001;
(Continued)

(56) References Cited

U.S. PATENT DOCUMENTS 7,269,151 B2 *  9/2007  Diener ................. H04L 1/1664
                                                                     370/329
10,813,063 B2 * 10/2020  Ly ........................... H04L 5/001
(Continued)

FOREIGN PATENT DOCUMENTS

CN          110431789 A      11/2019
EP            3706381 A1      9/2020
(Continued)

OTHER PUBLICATIONS

CMCC, Huawei, HiSilicon: "Introduction of inter-frequency measurement without gap", 3GPP Draft; R2-2005446, 3rd Generation Partnership Project (3GPP), Mobile Competence Centre; 650, route des Lucioles; F-06921 SophiaAntipolis Cedex; France, vol. RAN WG2, No. electronic; Jun. 1, 2020-Jun. 12, 2020, May 22, 2020 (May 22, 2020), XP051888774, total 5 pages.
(Continued)

*Primary Examiner* — John Pezzlo
(74) *Attorney, Agent, or Firm* — HAUPTMAN HAM, LLP

(57) ABSTRACT

A communication method includes detecting a first common signal. The first common signal belongs to a first set. The first set includes at least two common signals having different frequency positions. The first common signal carries first indication information. The communication method also includes determining a first control resource based on the first indication information. The communication method further includes receiving first downlink control information (DCI) on the first control resource. The first DCI is used to schedule a system message.

20 Claims, 15 Drawing Sheets

(58) Field of Classification Search
    CPC ........... H04W 72/0453; H04W 72/232; H04W
        56/00; H04W 72/044
    USPC ........................ 370/252, 329, 430, 442, 503
    See application file for complete search history.

(56)                    References Cited

U.S. PATENT DOCUMENTS

| | | | |
|---|---|---|---|
| 2015/0373528 A1* | 12/2015 | Iwai ........................ | H04W 4/70 |
| | | | 455/419 |
| 2018/0192383 A1 | 7/2018 | Nam et al. | |
| 2018/0288004 A1* | 10/2018 | Fei .......................... | H04W 4/80 |
| 2019/0150110 A1* | 5/2019 | Ko ........................ | H04W 72/23 |
| | | | 370/350 |
| 2021/0037581 A1* | 2/2021 | Ko ........................ | H04W 12/06 |
| 2021/0127413 A1* | 4/2021 | Lu ........................ | H04W 72/044 |
| 2021/0298025 A1* | 9/2021 | Wang .................... | H04L 5/0053 |
| 2023/0132121 A1* | 4/2023 | He ........................ | H04L 5/0092 |
| | | | 370/329 |
| 2024/0014831 A1* | 1/2024 | Parker ................. | H04B 1/0003 |

FOREIGN PATENT DOCUMENTS

| | | | |
|---|---|---|---|
| WO | 2014110833 A1 | 7/2014 | |
| WO | 2021009817 A1 | 1/2021 | |
| WO | 2021031390 A1 | 2/2021 | |

OTHER PUBLICATIONS

Extended European Search Report issued in corresponding European Application No. 22770641.3, dated Aug. 12, 2024, pp. 1-11.

* cited by examiner

SSB pattern (SSB pattern) 1

SSB pattern (SSB pattern) 2

SSB pattern (SSB pattern) 1

SSB pattern (SSB pattern) 2

Core network
device 110

Radio access
network device 120

Terminal
device 130

Terminal
device 140

METHOD AND APPARATUS FOR DETERMINING CONTROL RESOURCES BASED ON COMMON SIGNAL INDICATION INFORMATION

CROSS-REFERENCE TO RELATED APPLICATIONS

This application is a continuation of International Application No. PCT/CN2022/081781, filed on Mar. 18, 2022, which claims priority to Chinese Patent Application No. 202110297106.2, filed on Mar. 19, 2021. The disclosures of the aforementioned applications are hereby incorporated by reference in their entireties.

TECHNICAL FIELD

Embodiments of this application relate to the wireless communication field, and in particular, to a communication method and apparatus.

BACKGROUND

An initial access signal of a 5G new radio (NR) system has two phases. In the first phase, an initial access signal is referred to as a synchronization signal and PBCH block (SSB), and includes a primary synchronization signal (PSS), a secondary synchronization signal (SSS), and a physical broadcast channel (PBCH). NR supports a plurality of SSB transmission periodicities. In an initial access phase, a terminal device assumes that an SSB transmission periodicity is 20 ms, that is, duration of two radio frames. In addition, the NR system is deployed at a higher frequency than long term evolution (LTE). Therefore, a beamforming mechanism is used in NR, to implement omnidirectional coverage by sending a plurality of SSBs with different beams in a plurality of time domain positions. In the second phase, an initial access signal is carried on a physical downlink shared channel (PDSCH), and a time-frequency position of a physical downlink control channel (PDCCH) scheduling the PDSCH is indicated by the initial access signal in the first phase.

Currently, 5G NR supports only time division multiplexing (TDM) transmission for the initial access signal in the first phase. Only one SSB pattern is supported in one band. The pattern includes a plurality of SSBs corresponding to different SSB indexes. The plurality of SSBs are transmitted in a same frequency domain position and in different time domain positions. Therefore, the foregoing design lacks frequency flexibility, transmission of a plurality of SSBs in one SSB pattern consumes a large quantity of time domain resources, and is not friendly to carriers with uplink-dominated frame structures. Further, although a frequency domain position of the PDCCH scheduling the initial access signal in the second phase may be indicated by an SSB, frequency domain positions of the PDCCHs corresponding to all SSBs are the same, and time domain positions of the PDCCHs corresponding to all the SSBs are one-to-one correspond to SSB indexes. A correspondence between the SSBs and the PDCCHs is also inflexible.

To resolve the problem of frequency inflexibility of the initial access signal in the first phase, frequency division multiplexing (FDM) SSB transmission may be introduced. However, for FDM transmission for a plurality of SSBs, how to specify a time-frequency position of a corresponding PDCCH (for scheduling the initial access signal in the second phase) needs to be modified and optimized adaptively.

SUMMARY

Embodiments of this application provide a communication method and apparatus, to determine a time-frequency position of a corresponding PDCCH for FDM transmissions for a plurality of SSBs.

According to a first aspect, an embodiment of this application provides a communication method. The method may be performed by a communication apparatus, and the communication apparatus may be a terminal device or a chip in the terminal device. The method includes: The communication apparatus detects a first common signal, determines a first control resource based on first indication information, and receives first DCI on the first control resource, where the first common signal belongs to a first set, the first set includes at least two common signals whose frequency positions are different, the first common signal carries the first indication information, and the first DCI is used to schedule a system message. In an FDM transmission scenario for a plurality of common signals using the foregoing method, common signals in different frequency domain positions may indicate that respective corresponding indication information is flexibly associated with control resources, for example, control resources in a same position or in different positions, so that the control resources can be easily and flexibly indicated.

In a possible design, the first indication information indicates a frequency domain position of the first common signal. For example, the communication apparatus may determine the first control resource based on the first indication information by using, but not limited to, the following method: The communication apparatus determines the frequency domain position of the first control resource based on the frequency domain position of the first common signal and a first frequency offset. The first frequency offset is predefined. According to the foregoing design, from the perspective of simple implementation, a predefined frequency offset is supported, so that the frequency domain position of the first control resource is directly determined.

In a possible design, the first indication information indicates a frequency domain position of the first common signal and a first frequency offset. For example, the communication apparatus may determine the first control resource based on the first indication information by using, but not limited to, the following method: The communication apparatus determines the frequency domain position of the first control resource based on the frequency domain position of the first common signal and the first frequency offset. According to the foregoing design, from the perspective of network deployment flexibility, different frequency offsets can be dynamically indicated, and the frequency domain position of the first control resource can be adjusted, to enhance transmission flexibility.

In a possible design, the first indication information indicates a frequency domain position of the first common signal. For example, the communication apparatus may determine the first control resource based on the first indication information by using, but not limited to, the following method: The communication apparatus determines a frequency domain position of a reference common signal based on the frequency domain position of the first common signal, where the first set includes the reference common signal, and determines the frequency domain position of the first control resource based on the frequency domain position of the reference common signal and a first frequency offset. The first frequency offset is predefined. According to the foregoing design, the frequency domain position of the first control resource is allowed to be determined based on a fixed reference common signal, to ensure that control resources corresponding to different common signals have a same frequency domain position, and enable sending of the plurality of common signals corresponding to one system message, thereby reducing system message sending overheads.

In a possible design, the first indication information indicates a frequency domain position of the first common signal and a first frequency offset. For example, the communication apparatus may determine the first control resource based on the first indication information by using, but not limited to, the following method: The communication apparatus determines a frequency domain position of a reference common signal based on the frequency domain position of the first common signal, where the first set includes the reference common signal, and determines the frequency domain position of the first control resource based on the frequency domain position of the reference common signal and the first frequency offset. According to the foregoing design, on one hand, a control resource is determined based on a fixed reference signal, so that a network device plans a potential position of the control resource. On the other hand, different frequency offsets can be dynamically indicated by the first indication information, so that the frequency domain position of the first control resource is adjusted, to enhance transmission flexibility.

In a possible design, the first indication information further indicates an index of the first common signal in the first set. For example, the communication apparatus may determine the frequency domain position of the reference common signal based on the frequency domain position of the first common signal by using, but not limited to, the following method: The communication apparatus determines the frequency domain position of the reference common signal based on the frequency domain position of the first common signal, the index of the first common signal in the first set, an index of the reference common signal in the first set, and a pattern of the first set. The index of the reference common signal in the first set may be predefined, or may be indicated by the first indication information.

According to the foregoing design, the frequency domain position of the reference common signal can be easily determined based on the frequency domain position of the first common signal.

In a possible design, the method further includes: The communication apparatus obtains first information. The first information indicates an index of the pattern of the first set. The pattern of the first set defines a time-frequency position of each common signal in the first set and an index of each common signal in the first set. For example, the pattern of the first set corresponds to one time domain periodicity and one frequency domain unit, and defines the index of each common signal in the first set and a relative time-frequency position of each common signal in the time domain periodicity and the frequency domain unit.

In a possible design, the method further includes: The communication apparatus detects a second common signal, where the second common signal belongs to the first set, a frequency position of the second common signal is different from the frequency position of the first common signal, and determines a frequency domain position of a second control resource based on the frequency domain position of the second common signal and a second frequency offset. The first frequency offset is different from the second frequency offset.

According to the foregoing design, from the perspective of flexibility, different frequency offsets are allowed to be indicated, so that control resources corresponding to two FDM-ed common signals can have a same frequency domain position or different frequency domain positions. When the control resources corresponding to the two FDM-ed common signals are the same, a quantity of times that DCI and a subsequent system message are sent can be reduced, and signaling overheads can be reduced.

In a possible design, the first indication information indicates a time domain position of the first common signal. For example, the communication apparatus may determine the first control resource based on the first indication information by using, but not limited to, the following method: The communication apparatus determines a time domain position of the first control resource based on the time domain position of the first common signal and a first time offset. The first time offset is predefined.

According to the foregoing design, from the perspective of simple implementation, a predefined time offset is supported, so that the time domain position of the first control resource is directly determined.

In a possible design, the first indication information indicates a time domain position of the first common signal and a first time offset. For example, the communication apparatus may determine the first control resource based on the first indication information by using, but not limited to, the following method: The communication apparatus determines the time domain position of the first control resource based on the time domain position of the first common signal and the first time offset.

According to the foregoing design, from the perspective of network deployment flexibility, time offsets can be dynamically indicated, and the time domain position of the first control resource can be adjusted, to enhance transmission flexibility.

In a possible design, the method further includes: The communication apparatus detects a third common signal, where the third common signal belongs to the first set, and a time domain position of the third common signal is the same as the time domain position of the first common signal, and determines a time domain position of a third control resource based on the time domain position of the third common signal and a third time offset. The first time offset is different from the third time offset.

According to the foregoing design, from the perspective of flexibility, different time offsets are allowed to be indicated, so that control resources corresponding to two FDM-ed common signals can have a same time domain position or different frequency domain positions. When the control resources corresponding to the two FDM-ed common signals are the same, a quantity of times that DCI and a subsequent system message are sent can be reduced, and signaling overheads can be reduced.

In a possible design, the first indication information indicates the index of the first common signal in the first set. For example, the communication apparatus may determine the first control resource based on the first indication information by using, but not limited to, the following method: The communication apparatus determines the time domain position of the first control resource based on the index of the first common signal in the first set. For example, one or more of a radio frame, a subframe, a slot, or a symbol in which the corresponding first control resource is located may be determined based on the index of the first common signal. Control resources corresponding to common signals with different indexes may be in different time domain positions or in a same time domain position. For example, a time domain position of a control resource is determined based on a result of performing a modulo operation on N by a value of the index. This can ensure that N consecutive indexes correspond to a time domain position of a same control resource. N may be predefined or indicated by a common signal.

In a possible design, the first indication information indicates the index of the first common signal in the first set. For example, the communication apparatus may determine the first control resource based on the first indication information by using, but not limited to, the following method: The communication apparatus determines a time domain position and a frequency domain position of the first control resource based on the index of the first common signal in the first set.

According to the foregoing design, from the perspective of simple implementation, the time domain position of the first control resource is directly determined based on the index of the first common signal in the first set.

According to a second aspect, an embodiment of this application provides a communication method. The method may be performed by a communication apparatus, and the communication apparatus may be a network device or a chip in the network device. The method includes:

The communication apparatus sends a first common signal. The first common signal belongs to a first set, the first set includes at least two common signals whose frequency positions are different, the first common signal carries first indication information, and the first indication information is used to determine a first control resource. The communication apparatus sends first DCI on the first control resource. The first DCI is used to schedule a system message. According to the foregoing method, in an FDM scenario for a common signal, a control resource can be easily and flexibly indicated.

In a possible design, the first indication information indicates a frequency domain position of the first common signal, and a first frequency offset is predefined. Alternatively, the first indication information indicates a frequency domain position of the first common signal and a first frequency offset.

According to the foregoing design, from the perspective of simple implementation, a predefined frequency offset is supported, so that the frequency domain position of the first control resource is directly determined. According to the foregoing design, from the perspective of network deployment flexibility, different frequency offsets can be dynamically indicated, and the frequency domain position of the first control resource can be adjusted, to enhance transmission flexibility.

In a possible design, the method further includes:

The communication apparatus sends a second common signal. The second common signal belongs to the first set, and a frequency position of the second common signal is different from the frequency position of the first common signal. The second common signal includes second indication information. The second indication information is used to determine a second control resource. The second indication information indicates a frequency domain position of the second common signal and a second frequency offset. The first frequency offset is different from the second frequency offset.

According to the foregoing design, from the perspective of flexibility, different frequency offsets are allowed to be indicated, so that control resources corresponding to two FDM-ed common signals can have a same frequency domain position or different frequency domain positions. When the control resources corresponding to the two FDM-ed common signals are the same, a quantity of times that DCI and a subsequent system message are sent can be reduced, and signaling overheads can be reduced.

In a possible design, the first indication information indicates a time domain position of the first common signal, and a first time offset is predefined. Alternatively, the first indication information indicates a time domain position of the first common signal and a first time offset.

According to the foregoing design, from the perspective of simple implementation, a predefined time offset is supported, so that the time domain position of the first control resource is directly determined. According to the foregoing design, from the perspective of network deployment flexibility, time offsets can be dynamically indicated, and the time domain position of the first control resource can be adjusted, to enhance transmission flexibility.

In a possible design, the method further includes: The communication apparatus sends a third common signal. The third common signal belongs to the first set, and a time domain position of the third common signal is the same as the time domain position of the first common signal. The third common signal includes third indication information, and the third indication information is used to determine a third control resource. The third indication information indicates a time domain position of the third common signal and a third time offset. The first time offset is different from the third time offset.

According to the foregoing design, from the perspective of flexibility, different time offsets are allowed to be indicated, so that control resources corresponding to two FDM-ed common signals can have a same time domain position or different frequency domain positions. When the control resources corresponding to the two FDM-ed common signals are the same, a quantity of times that DCI and a subsequent system message are sent can be reduced, and signaling overheads can be reduced.

In a possible design, the first indication information indicates an index of the first common signal in the first set.

In a possible design, the method further includes: The communication apparatus sends first information. The first information indicates an index of a pattern of the first set. The pattern of the first set defines a time-frequency position of each common signal in the first set and an index of each common signal in the first set.

According to a third aspect, an embodiment of this application provides a communication apparatus. The apparatus includes: a transceiver unit and a processing unit.

The transceiver unit is configured to detect a first common signal. The first common signal belongs to a first set, the first set includes at least two common signals whose frequency positions are different, and the first common signal carries first indication information. The processing unit is configured to determine a first control resource based on the first indication information. The transceiver unit is configured to receive first downlink control information DCI on the first control resource. The first DCI is used to schedule a system message.

In a possible design, the first indication information indicates a frequency domain position of the first common signal. When determining the first control resource based on the first indication information, the processing unit is configured to determine a frequency domain position of the first control resource based on the frequency domain position of the first common signal and a first frequency offset. The first frequency offset is predefined.

In a possible design, the first indication information indicates a frequency domain position of the first common signal and a first frequency offset. When determining the first control resource based on the first indication information, the processing unit is configured to determine a frequency domain position of the first control resource based on the frequency domain position of the first common signal and the first frequency offset.

In a possible design, the first indication information indicates a frequency domain position of the first common signal. When determining the first control resource based on the first indication information, the processing unit is configured to: determine a frequency domain position of a reference common signal based on the frequency domain position of the first common signal, where the first set includes the reference common signal; and determine a frequency domain position of the first control resource based on the frequency domain position of the reference common signal and a first frequency offset. The first frequency offset is predefined.

In a possible design, the first indication information indicates a frequency domain position of the first common signal and a first frequency offset. When determining the first control resource based on the first indication information, the processing unit is configured to: determine a frequency domain position of a reference common signal based on the frequency domain position of the first common signal, where the first set includes the reference common signal; and determine a frequency domain position of the first control resource based on the frequency domain position of the reference common signal and the first frequency offset.

In a possible design, the first indication information further indicates an index of the first common signal in the first set. When determining the frequency domain position of the reference common signal based on the frequency domain position of the first common signal, the processing unit is configured to: determine the frequency domain position of the reference common signal based on the frequency domain position of the first common signal, the index of the first common signal in the first set, an index of the reference common signal in the first set, and a pattern of the first set.

In a possible design, the processing unit is configured to obtain first information. The first information indicates an index of the pattern of the first set. The pattern of the first set defines a time-frequency position of each common signal in the first set and an index of each common signal in the first set.

In a possible design, the transceiver unit is configured to detect a second common signal. The second common signal belongs to the first set, and a frequency position of the second common signal is different from the frequency position of the first common signal. The processing unit is configured to determine a frequency domain position of a second control resource based on the frequency domain position of the second common signal and a second frequency offset. The first frequency offset is different from the second frequency offset.

In a possible design, the first indication information indicates a time domain position of the first common signal. When determining the first control resource based on the first indication information, the processing unit is configured to determine a time domain position of the first control resource based on the time domain position of the first common signal and a first time offset. The first time offset is predefined.

In a possible design, the first indication information indicates a time domain position of the first common signal and a first time offset. When determining the first control resource based on the first indication information, the processing unit is configured to determine a time domain position of the first control resource based on the time domain position of the first common signal and the first time offset.

In a possible design, the transceiver unit is configured to detect a third common signal. The third common signal belongs to the first set, and a time domain position of the third common signal is the same as the time domain position of the first common signal. The processing unit is configured to determine a time domain position of a third control resource based on the time domain position of the third common signal and a third time offset. The first time offset is different from the third time offset.

In a possible design, the first indication information indicates the index of the first common signal in the first set. When determining the first control resource based on the first indication information, the processing unit is configured to determine the time domain position of the first control resource based on the index of the first common signal in the first set.

In a possible design, the first indication information indicates an index of the first common signal in the first set. When determining the first control resource based on the first indication information, the processing unit is configured to determine a frequency domain position and a time domain position of the first control resource based on the index of the first common signal in the first set.

According to a fourth aspect, an embodiment of this application provides a communication apparatus. The apparatus includes: a transceiver unit and a processing unit.

The processing unit invokes the transceiver unit to send a first common signal, where the first common signal belongs to a first set, the first set includes at least two common signals whose frequency positions are different, the first common signal carries first indication information, and the first indication information is used to determine a first control resource; and send first DCI on the first control resource, where the first DCI is used to schedule a system message.

In a possible design, the first indication information indicates a frequency domain position of the first common signal, and a first frequency offset is predefined. Alternatively, the first indication information indicates a frequency domain position of the first common signal and a first frequency offset.

In a possible design, the transceiver unit is configured to send a second common signal. The second common signal belongs to the first set, and a frequency position of the second common signal is different from the frequency position of the first common signal. The second common signal includes second indication information. The second indication information is used to determine a second control resource. The second indication information indicates a frequency domain position of the second common signal and a second frequency offset. The first frequency offset is different from the second frequency offset.

In a possible design, the first indication information indicates a time domain position of the first common signal, and a first time offset is predefined. Alternatively, the first indication information indicates a time domain position of the first common signal and a first time offset.

In a possible design, the transceiver unit is configured to send a third common signal. The third common signal belongs to the first set, and a time domain position of the third common signal is the same as the time domain position of the first common signal. The third common signal includes third indication information, and the third indication information is used to determine the third control resource. The third indication information indicates a time domain position of the third common signal and a third time offset. The first time offset is different from the third time offset.

In a possible design, the first indication information indicates an index of the first common signal in the first set.

In a possible design, the transceiver unit is configured to send first information. The first information indicates an index of a pattern of the first set. The pattern of the first set defines a time-frequency position of each common signal in the first set and an index of each common signal in the first set.

According to a fifth aspect, an embodiment of this application provides a communication apparatus. The apparatus includes a module configured to perform any one of the first aspect and the possible designs of the first aspect, or a module configured to perform any one of the second aspect and the possible designs of the second aspect.

According to a sixth aspect, a communication apparatus is provided, including a processor. The processor is coupled to a memory, and may be configured to execute instructions in the memory, to implement any possible design of the first aspect, or the second aspect and any possible design of the second aspect. Optionally, the communication apparatus further includes a communication interface. The processor is coupled to the communication interface. The communication interface is configured to input and/or output information. The information includes at least one of instructions and data. Optionally, the communication apparatus further includes the memory.

In an implementation, the communication apparatus is a terminal device or a network device. When the communication apparatus is the terminal device or the network device, the communication interface may be a transceiver or an input/output interface. Optionally, the transceiver may be a transceiver circuit. Optionally, the input/output interface may be an input/output circuit.

In another implementation, the communication apparatus is a chip or a chip system disposed in a terminal device or a network device. When the communication apparatus is the chip or the chip system disposed in the terminal device, the communication interface may be an input/output interface, an interface circuit, an output circuit, an input circuit, a pin, a related circuit, or the like. The processor may alternatively be embodied as a processing circuit or a logic circuit.

According to a seventh aspect, an embodiment of this application provides a communication apparatus, including a processor and an interface circuit. The interface circuit is configured to input and/or output information. The information includes at least one of instructions and data. The interface circuit can receive a signal from a communication apparatus other than the communication apparatus, and transmit the signal to the processor, or send a signal from the processor to a communication apparatus other than the communication apparatus. The processor is configured to implement any one of the first aspect and the possible designs of the first aspect, or implement any one of the second aspect and the possible designs of the second aspect by using a logic circuit or by executing code instructions.

According to an eighth aspect, an embodiment of this application provides a computer-readable storage medium. The storage medium stores a computer program or instructions. When the computer program or the instructions are executed by a communication apparatus, any one of the first aspect and the possible designs of the first aspect is implemented, or any one of the second aspect and the possible designs of the second aspect is implemented.

According to a ninth aspect, an embodiment of this application provides a computer program product including a program. When the computer program product runs on a communication apparatus, the communication apparatus is enabled to perform any one of the first aspect and the possible designs of the first aspect, or perform any one of the second aspect and the possible designs of the second aspect.

DESCRIPTION OF EMBODIMENTS

Figures 1, 2:
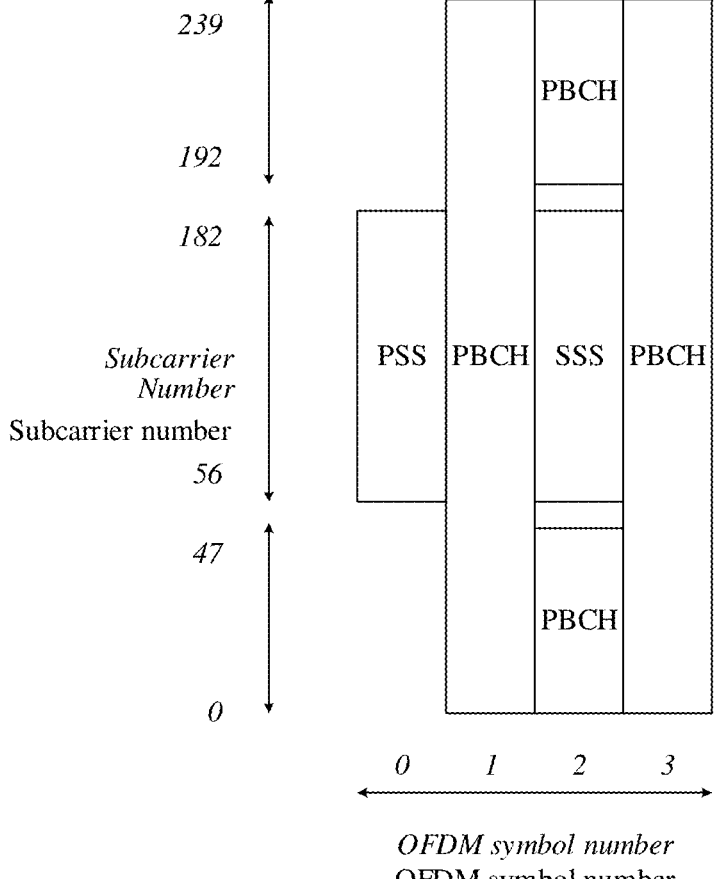
FIG. 1 is a schematic diagram of a structure of an SSB according to an embodiment of this application.
FIG. 2 is a schematic diagram of an SSB pattern in Case C according to an embodiment of this application.

In cellular communication, before accessing a network, a terminal device needs to complete an initial access phase, including detecting a synchronization signal sent by a network device and a broadcast basic system configuration parameter. Currently, in a 4G LTE system and a 5G NR system, an initial access signal is usually completed in two phases. For example, in the 4G LTE system, an initial access signal in the first phase includes a PSS, an SSS, and a PBCH, and is definitely located in a bandwidth of six resource blocks (RB) at a carrier center in frequency domain. A terminal device can obtain the carrier bandwidth after receiving the PBCH. In time domain, transmission period-icities of the PSS and SSS are 5 subframes, and a transmission periodicity of the PBCH is 10 subframes. After detecting the initial access signal in the first phase, the terminal device completes downlink timing synchronization, and determines, based on a master information block (MIB) carried on the PBCH, how to receive an initial access signal in the second phase. The initial access signal in the second phase is carried on a PDSCH, and a specific time-frequency resource on which the PDSCH is located is scheduled and indicated by a PDCCH. A time-frequency resource on which the PDCCH is located is fixedly the first four symbols of a subframe, and occupies an entire bandwidth in frequency domain.

It can be learned that in 4G LTE, an initial access signal design is fixed, a time-frequency position of the initial access signal in the first phase is fixed, and the time-frequency position of the PDCCH for scheduling the initial access signal in the second phase is also fixed. In contrast, in the 5G NR system, an initial access signal design is much more convenient and flexible. An initial access signal in the first phase is referred to as an SSB. A frequency domain position of the SSB in a carrier is flexible, and the SSB does not need to be limited to a carrier center as in the LTE system. In terms of a time domain periodicity, NR supports a plurality of SSB transmission periodicities. An initial access signal in the second phase is also carried on a PDSCH. However, a position of a PDCCH for scheduling the PDSCH is no longer fixed, and a time-frequency position of the PDCCH is indicated by the initial access signal in the first phase. This is more flexible.

A process in which the terminal device accesses a cell in an idle state and switches to a connected state in NR mainly includes three steps: SSB detection, system information block (SIB) 1 receiving, and a random access channel (RACH). Embodiments of this application mainly focus on two steps: SSB detection and SIB1 receiving. When performing initial access, the terminal device needs to obtain downlink time synchronization and frequency synchronization, and obtain a basic configuration parameter of an accessed cell. Currently, the foregoing operations are completed in a 2-level broadcast mode in the NR system. First, a synchronization signal SS and a physical broadcast channel PBCH, that is, SSBs are broadcast. The terminal detects the SSB to obtain an SSB index and other timing information carried in a MIB carried on the PBCH, to complete time synchronization. Control resource indication information in the MIB is used to determine DCI for detecting and scheduling a SIB1, and another important system parameter is received by using the SIB1 and frequency synchronization is completed.

The SSB includes the synchronization signal (SS) and the PBCH. The SS further includes a PSS and an SSS, and the PBCH carries a MIB of an accessed cell. The SSB and the PBCH are jointly used to obtain a cell ID, downlink timing, and a most important system message (for example, indication information of a time-frequency position in which a subsequent SIB1 is received). The cell ID is jointly carried by the PSS and the SSS. A structure of the SSB is shown in FIG. 1. The SSB includes four consecutive symbols in time domain, and occupies 20 RBs in frequency domain, as shown in FIG. 1.

A frequency domain position of the SSB is defined by a synchronization raster. Each band defined in 3GPP has a specific quantity of synchronization raster positions, and each synchronization raster position corresponds to one absolute frequency position, and corresponds to a center frequency of the SSB, that is, a center frequency of a first subcarrier of an eleventh RB. Correspondingly, when performing cell search, the terminal device detects, for each band based on a historical record or through blind detection, whether there is an SSB in a potential synchronization raster position in the band.

A time domain position of the SSB is defined by an SSB pattern. An SSB pattern specifies time domain positions of a group of consecutive SSBs in a half frame. Currently, 3GPP defines five SSB patterns for an unshared spectrum, and each SSB pattern has an applicable subcarrier spacing (SCS) for subcarrier detection. However, only one or two SSB patterns are available for each band.

Currently, a mainstream NR band n78 (3.3 GHz to 3.8 GHz) is used. This band supports only an SSB pattern in Case C. The SSB pattern in Case C is used as an example, is applicable to a 30 kHz SCS, and includes eight SSBs, that is, SSB indexes #0 to #7. The eight SSBs are located in the first four slots in a half-frame, and each slot includes two SSBs. Start symbols are respectively #2 and #8. Specific positions of the SSBs are shown in FIG. 2. Correspondingly, when performing cell search, after detecting an SSB in a band, the terminal device needs to complete downlink timing synchronization based on a time domain position of the detected SSB, an SSB index, a frame index in a MIB, and a half-frame index. After completing downlink timing synchronization, the terminal device determines, based on a time-frequency position of a current SSB and an SSB index, a time-frequency position for receiving a PDCCH used to schedule SIB1. A frequency domain position of the PDCCH is referred to as a control resource set (CORESET) #0 in NR, and a time domain position of the PDCCH is referred to as common search space (CSS) #0. A correspondence between the time-frequency position of the SSB and the CORESET #0 and the CSS #0 may be determined in the following manner.

(1) CORESET #0 determining: After detecting the SSB, the terminal device obtains 4-bit signaling controlResource-SetZero from the MIB. The signaling indicates SSBMux-Pattern, an offset, $N_{RB}^{CORESET}$, and $N_{sym}^{CORESET}$. The terminal device reads another piece of 4-bit signaling $k_{SSB}$ from the MIB.

The SSBMuxPattern indicates an SSB and CSS #0 multiplexing pattern, and is used to subsequently determine the CSS #0, for example, MuxPattern #1, MuxPattern #2, and MuxPattern #3.

The offset and $k_{SSB}$ are used to determine a position of a start RB of the CORESET #0. $k_{SSB}$ indicates a distance (unit: a quantity of subcarriers) between a start subcarrier of the SSB and a reference RB (referred to as CRB S in FIG. 3). The offset indicates a distance (unit: RB) from the reference RB to the start RB of the CORESET #0. $N_{sym}^{CORESET}$ indicates a quantity of symbols occupied by the CORESET #0 in time domain, that is, indicates a time domain length (unit: symbol) of the CORESET #0.

$N_{RB}^{CORESET}$ is used to determine a frequency domain width of the CORESET #0.

Figure 4:
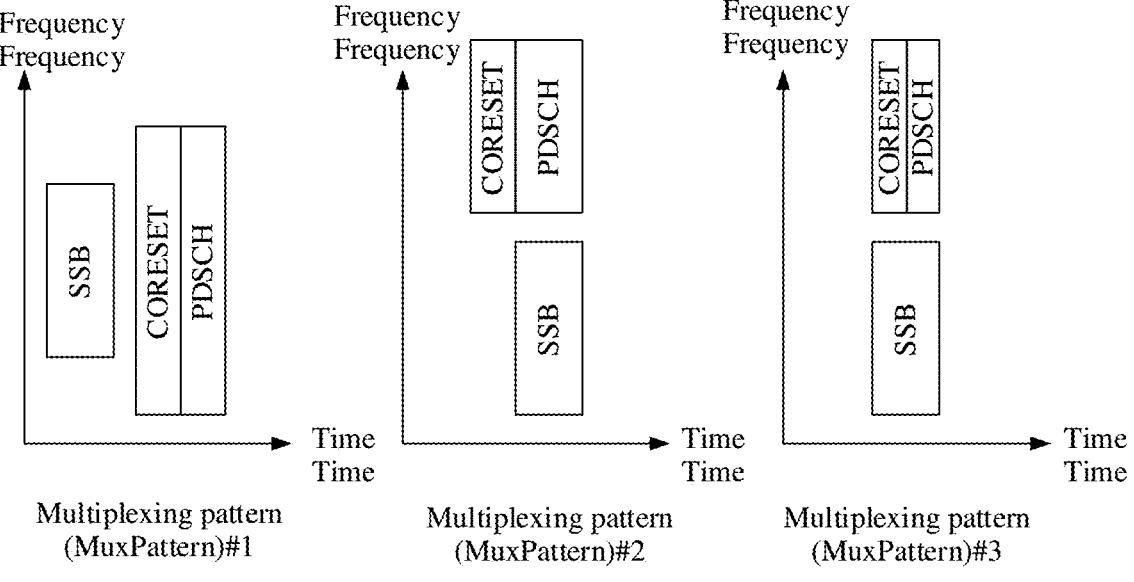
FIG. 4 is a schematic diagram of a multiplexing pattern of an SSB and a CSS #0 according to an embodiment of this application.

(2) CSS #0 determining: The CSS #0 corresponds to a plurality of time domain positions, and one SSB index corresponds to a time domain position of one CSS #0 in NR. NR supports three SSB and CSS #0 multiplexing patterns. As shown in FIG. 4, methods for determining a time domain position of CSS #0 corresponding to an SSB index are different in the patterns.

Figure 5:
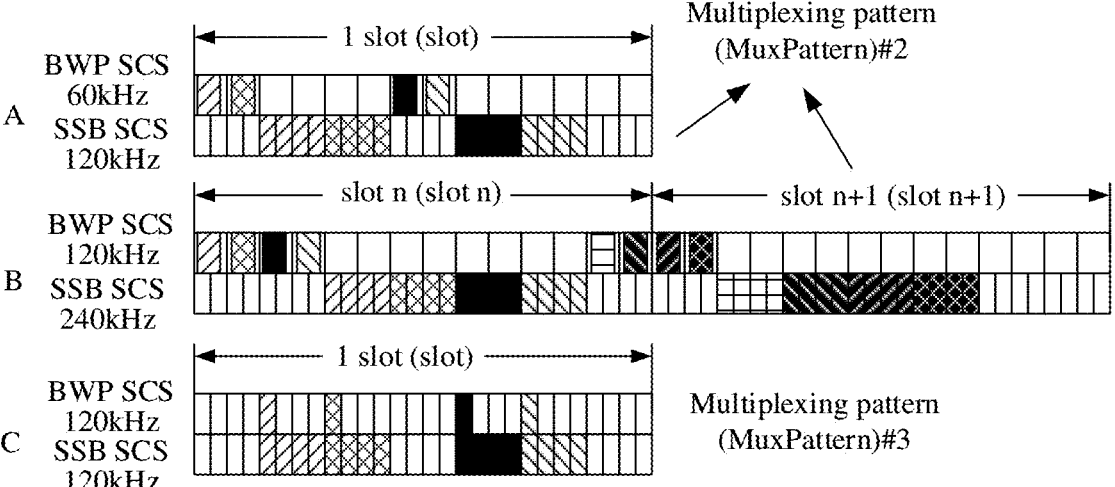
FIG. 5 is a schematic diagram of a correspondence between a time domain position of a CSS #0 and a time domain position of an SBB in a multiplexing pattern #2 and a multiplexing pattern #3 according to an embodiment of this application.

MuxPattern #2 and MuxPattern #3 are used only for FR2, one SSB index and a time domain position of CSS #0 corresponding to the SSB index are located in one slot. For MuxPattern #2, the CSS #0 is located in a symbol before the SSB. For MuxPattern #3, a symbol indicated by the CSS #0 completely overlaps a symbol occupied by the SSB, as shown in FIG. 5. A in FIG. 5 represents a possible correspondence between a time domain position of the CSS #0 and a time domain position of the SBB in MuxPattern #2. B in FIG. 5 represents another possible correspondence between a time domain position of the CSS #0 and a time domain position of the SBB in MuxPattern #2. C in FIG. 5 represents a possible correspondence between a time domain position of the CSS #0 and a time domain position of the SBB in MuxPattern #3.

A in FIG. 5 is used as an example. The time domain position of the CSS #0 (that is, a time domain resource corresponding to a black mark in the first row) is located before the time domain position of the SBB (that is, a time domain resource corresponding to a black mark in the second row), and the time domain position of the CSS #0 and the time domain position of the SBB are located in a same slot.

MuxPattern #1 is used for FR1 and FR2. The terminal device first reads 4-bit signaling searchSpaceZero from the MIB to obtain an offset O, a quantity 1/M of pieces of CSS #0 included in one slot, and positions of the 1/M pieces of CSS #0 in the slot, and then may determine the time domain position of the CSS #0 with reference to any SSB index i.

The following aspects may be included:

A sequence number $n_0$ of a slot is:

$$n_0 = (O \times 2^\mu + \lfloor i \times M \rfloor) \bmod N_{slot}^{frame,\mu},$$

and indicates a sequence number of the slot in a radio frame.

A sequence number $SFN_\varepsilon$ of a frame is as follows: If $$\lfloor (O \times 2^\mu + \lfloor i \times M \rfloor)/N_{slot}^{frame,\mu} \rfloor \bmod 2 = 0,$$

$SFN_c \bmod 2 = 0$; otherwise, $SFN_c \bmod 2 = 1$ to ensure that the CSS #0 is mapped in sequence along with the SSB index. O is the foregoing offset, μ is a sequence number of a subcarrier spacing, ε is an SSB index, M is a parameter of the quantity of pieces of CSS #0 in the foregoing slot, and $$N_{slot}^{frame,\mu}$$

represents a quantity of slots in one radio frame when the sequence number of the subcarrier spacing is μ.

Start symbol: If there is only one PDCCH transmission occasion in one slot, a start symbol is a symbol #0. If there are two PDCCH occasions in one slot, a start symbol of the first PDCCH occasion is a symbol #0, and a start symbol of the second PDCCH occasion is a symbol #7, or a symbol $$\# N_{symb}^{CORESET}.$$

Figure 6:
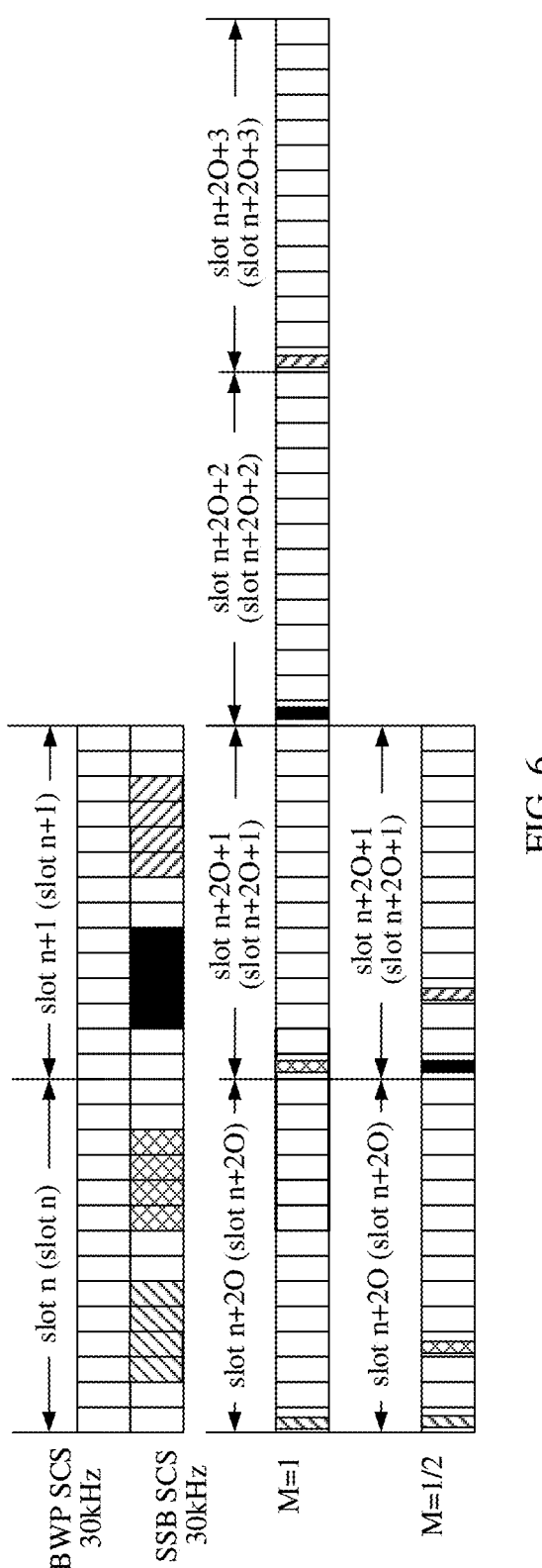
FIG. 6 is a schematic diagram of a correspondence between a time domain position of a CSS #0 and a time domain position of an SBB in a multiplexing pattern #1 according to an embodiment of this application.

FR1 is used as an example. It is assumed that a subcarrier spacing of an SSB is the same as a subcarrier spacing of a BWP, and both are 30 kHz. In this case, a diagram of a relationship between a time domain position of the CSS #0 and a time domain position of the SSB is shown in FIG. 6. Corresponding to different values of M, correspondences between the time domain position of the CSS #0 and the time domain position of the SBB are different. For example, when the time domain position of the SBB is in a slot n+1 (for example, a resource corresponding to a black mark in the slot n+1 in FIG. 6), if M=1, the time domain position of the corresponding CSS #0 is in a slot n+2O+2 (for example, a resource corresponding to a black mark in the slot n+2O+2 in FIG. 6). If M=½, the time domain position of the corresponding CSS #0 is in a slot n+2O+1 (for example, a resource corresponding to a black mark in the slot n+2O+1 in FIG. 6).

Currently, a plurality of SSB indexes support only TDM. Different SSB indexes correspond to CORESETs #0 with a same frequency domain position and time division multiplexed CSS #0 in a time domain position, and the CSS #0 one-to-one correspond to the SSB indexes.

Time division multiplexing is to consider a feature of an analog beam of FR2. In this way, different SSB indexes correspond to different analog beams, and different analog beams can only be time division multiplexed. A purpose of one-to-one correspondence between the CSS #0 and the SSB indexes is to enable the terminal device to know a receiver behavior, such as a spatial filtering behavior, channel estimation parameter adjustment, or the like, that is used for detecting a PDCCH for scheduling a SIB1. For example, a receiver behavior used when the terminal device detects an SSB index is the same as a receiver behavior used when a PDCCH on a corresponding CSS #0 is received.

Figure 3:
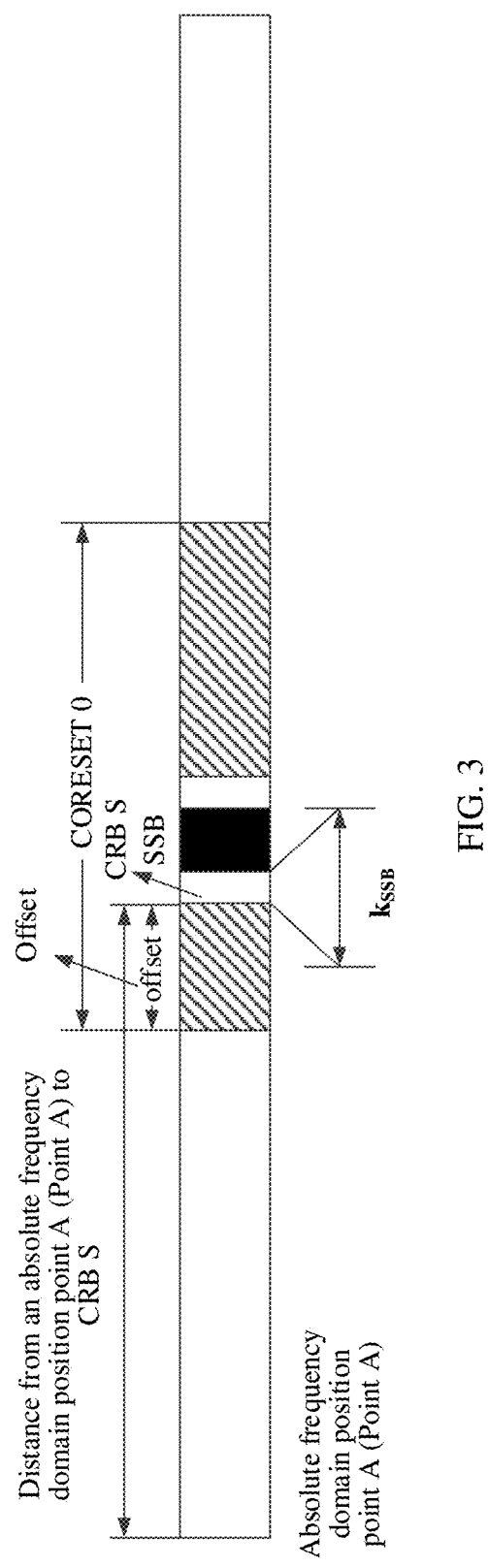
FIG. 3 is a schematic diagram of a correspondence between an SSB and a CORESET #0 according to an embodiment of this application.

The terminal device blindly detects a PDCCH in the CORESET #0 and the CSS #0. If the PDCCH is detected, the terminal device receives a PDSCH in a corresponding time-frequency position based on scheduling information included in the PDCCH, to receive the SIB1. The SIB1 includes a basic parameter configuration of a cell. The SIB1 includes a parameter $$N_{CRB}^{SSB}, \text{ and } N_{CRB}^{SSB}$$

indicates a distance from an absolute frequency domain position point A to the CRB S, as shown in FIG. 3. A process of obtaining the absolute frequency domain position point A is frequency synchronization. The terminal device subsequently determines a frequency position of another resource based on the point A.

Figure 7A:
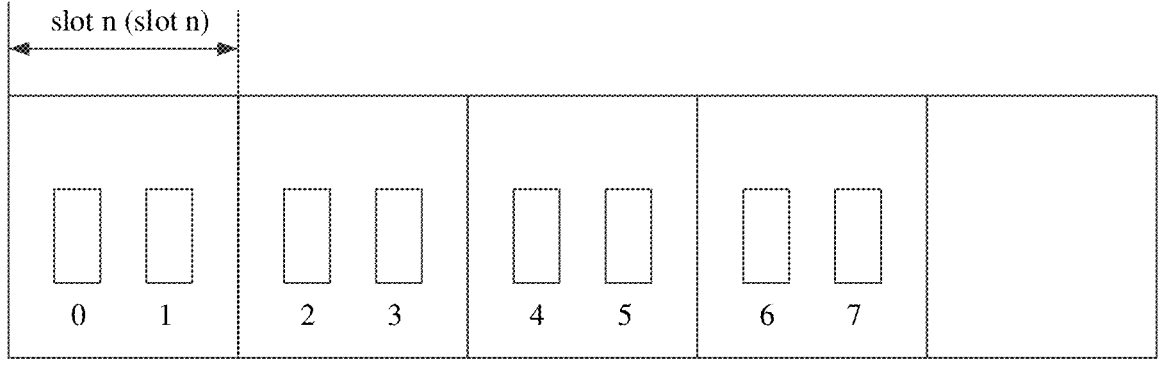
FIG. 7A is a schematic diagram 1 of an SSB pattern according to an embodiment of this application.
Figure 7B:
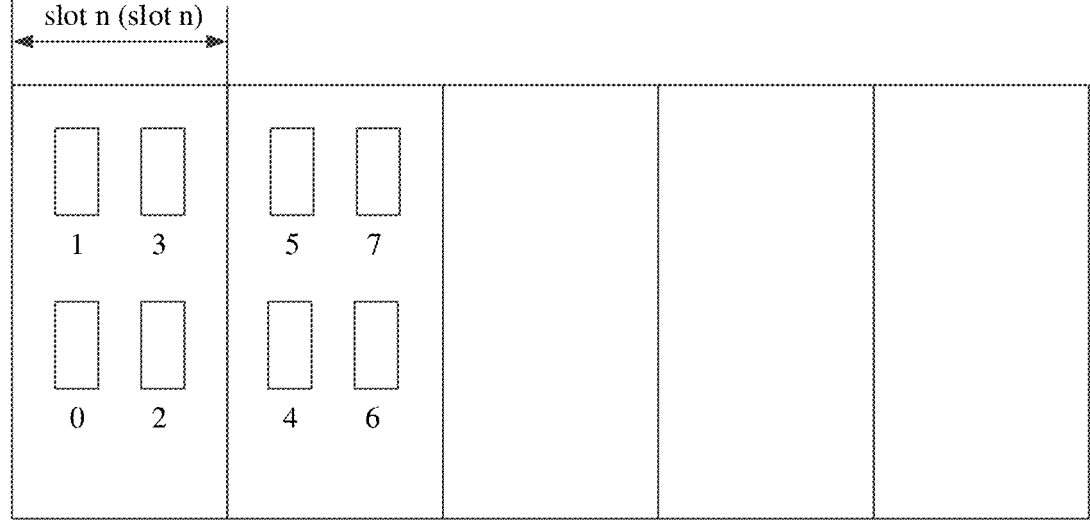
FIG. 7B is a schematic diagram 2 of an SSB pattern according to an embodiment of this application.

Currently, an SSB in the NR system uses a beamforming mechanism. A plurality of SSB indexes correspond to different beam directions and are sent in a time division manner, to improve coverage of a single SSB index. However, sending a plurality of SSB indexes in a time division manner causes a large access delay, and also imposes a large requirement on downlink transmission resources. For example, a plurality of FDM-ed SSB configurations may use but are not limited to the following two structures:

Case 1: Each band defines a plurality of SSB patterns, and different SSB patterns correspond to different SSB index arrangement patterns. A network device may select one SSB pattern based on a TDD frame structure, a target coverage area configured, and another parameter for a current frequency resource (such as a carrier), to send an SSB. For example, FIG. 7A and FIG. 7B show an SSB pattern 1 and an SSB pattern 2. In the SSB pattern shown in FIG. 7A, frequency domain positions of any two SSBs are the same. The SSB pattern shown in FIG. 7B includes both an FDM-ed SSB and a TDM-ed SSB. Numbers in FIG. 7A and FIG. 7B represent SSB indexes.

Figure 8:
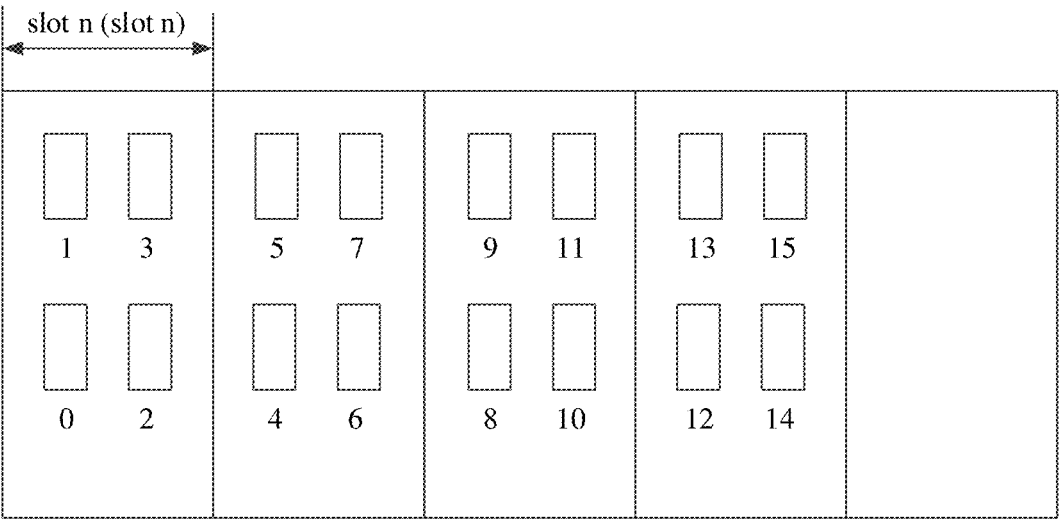
FIG. 8 is a schematic diagram 3 of an SSB pattern according to an embodiment of this application.
Figure 8:
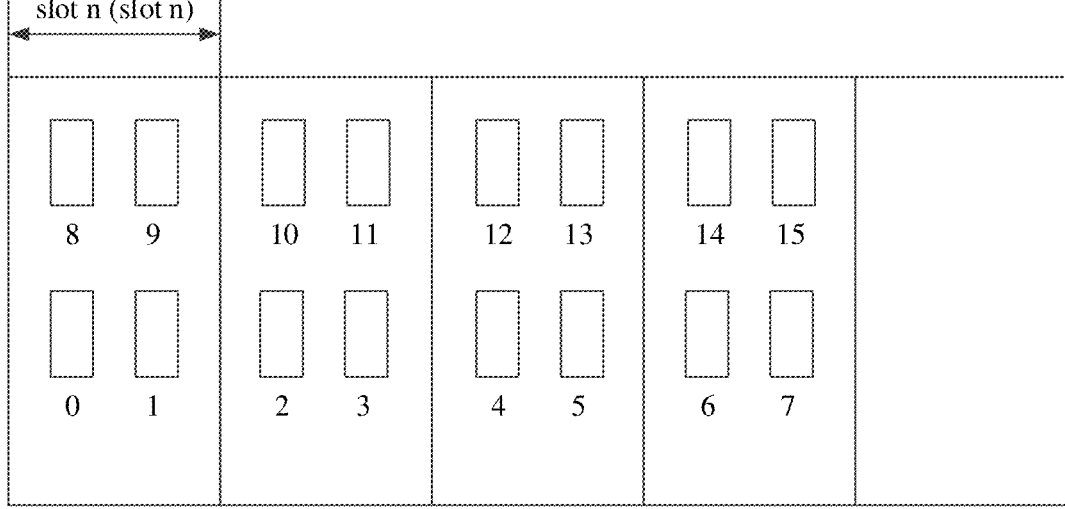

Case 2: Each band specifies one SSB pattern, and an arrangement pattern of SSB indexes in the band may be further indicated. This arrangement may include both an FDM-ed SSB and a TDM-ed SSB. For example, an SSB pattern 1 and an SSB pattern 2 shown in FIG. 8 have different arrangements of SSB indexes.

To receive an SIB1, the terminal device needs to determine a frequency domain position of the CORESET #0 and a time domain position of the CSS #0 in which the PDCCH for scheduling the SIB1 is located. A configuration relationship between an SSB index and the CORESET #0 and the CSS #0 in an existing NR system is applicable only to a scenario in which the SSB is sent in a time division manner, and corresponding modification needs to be performed.

Figure 9:
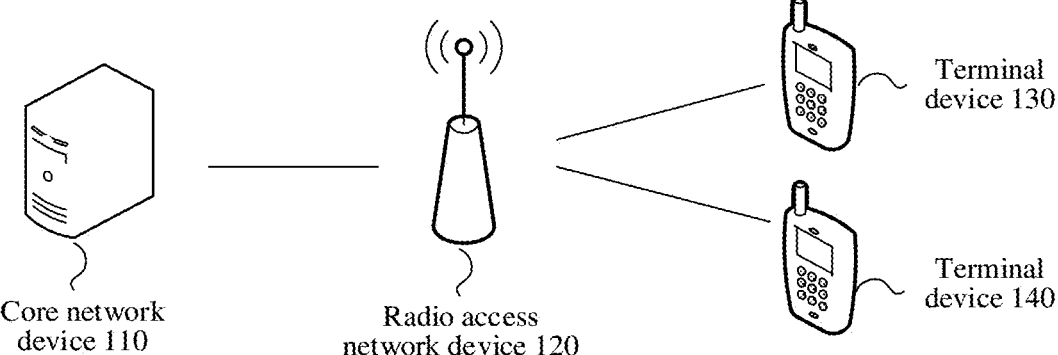
FIG. 9 is a schematic diagram of an architecture of a mobile communication system according to an embodiment of this application.

FIG. 9 is a schematic diagram of an architecture of a mobile communication system to which an embodiment of this application is applied. As shown in FIG. 9, the mobile communication system includes a core network device 110, a radio access network device 120, and at least one terminal device. (a terminal device 130 and a terminal device 140 in FIG. 9). The terminal device is connected to the radio access network device in a wireless manner, and the radio access network device is connected to the core network device in a wireless or wired manner. The core network device and the radio access network device may be independent and different physical devices, or functions of the core network device and logical functions of the radio access network device are integrated into a same physical device, or a part of functions of the core network device and a part of functions of the radio access network device are integrated into one physical device. The terminal device may be located in a fixed position, or may be movable. FIG. 9 is only a schematic diagram. The communication system may further include another network device, for example, may further include a wireless relay device and a wireless backhaul device, which are not shown in FIG. 9. Quantities of core network devices, radio access network devices, and terminal devices included in the mobile communication system are not limited in embodiments of this application.

The terminal device is connected to the radio access network device in a wireless manner, to access the mobile communication system. The radio access network device may be a base station, an evolved NodeB (eNodeB), a transmission reception point (TRP), a next generation NodeB (gNB) in a 5G mobile communication system, a base station in a future mobile communication system, an access node in a Wi-Fi system, or the like. Alternatively, the radio access network device may be a module or a unit that implements a part of functions of a base station, for example, may be a central unit (CU), or a distributed unit (DU). A specific technology and a specific device form that are used by the radio access network device are not limited in embodiments of this application. In this application, the radio access network device is referred to as a network device for short. Unless otherwise specified, network devices are all radio access network devices.

The terminal device may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

The network device and the terminal device may be deployed on the land, including an indoor device, an outdoor device, a handheld device, or a vehicle-mounted device; may be deployed on the water surface; or may be deployed on a plane, a balloon, and a satellite in the air. An application scenario of the network device and the terminal device is not limited in embodiments of this application.

The network device and the terminal device may communicate with each other by using an unshared spectrum, or may communicate with each other by using a shared spectrum, or may communicate with each other by using both the unshared spectrum and the shared spectrum. The network device and the terminal device may communicate with each other by using a spectrum below 6 gigahertz (GHz), may communicate with each other by using a spectrum above 6 GHz, or may communicate with each other by using both a spectrum below 6 GHz and a spectrum above 6 GHz. A spectrum resource used between the network device and the terminal device is not limited in embodiments of this application.

In embodiments of this application, a time domain symbol may be an orthogonal frequency division multiplexing (OFDM) symbol, or may be a discrete Fourier transform spread spectrum OFDM (DFT-s-OFDM) symbol. Unless otherwise specified, symbols in embodiments of this application are all time domain symbols.

It may be understood that in embodiments of this application, a PDSCH and a PDCCH are only used as examples of a downlink data channel and a downlink control channel. In different systems and different scenarios, a data channel and a control channel may have different names. This is not limited in embodiments of this application.

Based on this, embodiments of this application provide a communication method. The method is used to determine a time-frequency position of a control resource on which a PDCCH scheduling a SIB1 is located. Alternatively, the method is directly used to determine a time-frequency position of a data resource in which a PDSCH carrying the SIB1 is located. In this case, the PDSCH carrying the SIB1 is not dynamically scheduled by using DCI, but is directly configured by using an SSB. A method for determining a time-frequency position of a control resource in a subsequent embodiment may also be used to determine the time-frequency position of the data resource.

It should be noted that, the time-frequency position of the control resource on which the PDCCH scheduling the SIB1 is located may be determined by a CORESET #0 and CSS #0 in NR.

The names in 5G NR may not be used in a 6G system. A common signal in embodiments of this application includes a synchronization signal and a first broadcast channel. For example, the common signal includes a PSS, an SSS, and a PBCH. The PBCH includes a physical-layer demodulation reference signal (DMRS) and carried system information, for example, a MIB. For example, the common signal may be an SSB in NR.

A system message in embodiments of this application may be carried by a second broadcast channel. The second broadcast channel carries a part of system parameter configuration information, and the system message may be the SIB1 in NR.

The control resource in embodiments of this application is a time-frequency resource on which a PDCCH scheduling a system message is located. The control resource is used to transmit DCI. The control resource includes at least one sub-resource used to transmit the DCI, and the network device may choose to send the DCI on one or more of these sub-resources. The sub-resource herein may correspond to a PDCCH candidate in 5G NR, and the control resource may correspond to a time-frequency resource jointly determined by a CORESET and CSS in 5G NR. For example, a time-frequency position of the control resource may be determined by a start frequency domain position of the CORESET #0 and a start time domain position of the CSS #0. In other words, a frequency domain position of the control resource corresponds to the start frequency domain position of the CORESET #0, and a time domain position of the control resource corresponds to the start time domain position of the CSS #0.

The frequency domain position of the control resource may include two meanings: a start frequency domain position and a frequency domain width, and the time domain position of the control resource may include two meanings: a start time domain position and duration. Without loss of generality, the following frequency domain position is a start frequency domain position, and the time domain position is a start time domain position. The frequency domain width and the duration may be determined by using a similar method, or the frequency domain width and the duration are directly predefined.

It can be learned from the foregoing analysis that downlink time synchronization and frequency synchronization may not be completed when the terminal device determines the time-frequency position of the control resource. Therefore, a definition of the time-frequency position of the control resource is usually a relative definition. That is, the time-frequency position of the control resource is defined relative to a time-frequency position of a detected common signal. Certainly, the definition of the time-frequency position of the control resource may alternatively be an absolute definition. In this case, time synchronization or frequency synchronization needs to be completed first. For example, in an NR system, time synchronization may be completed after UE receives an SSB. Therefore, the definition of the time domain position of the control resource is absolute. However, frequency synchronization is not completed. Therefore, a definition of the frequency position of the control resource is relative.

Figure 10:
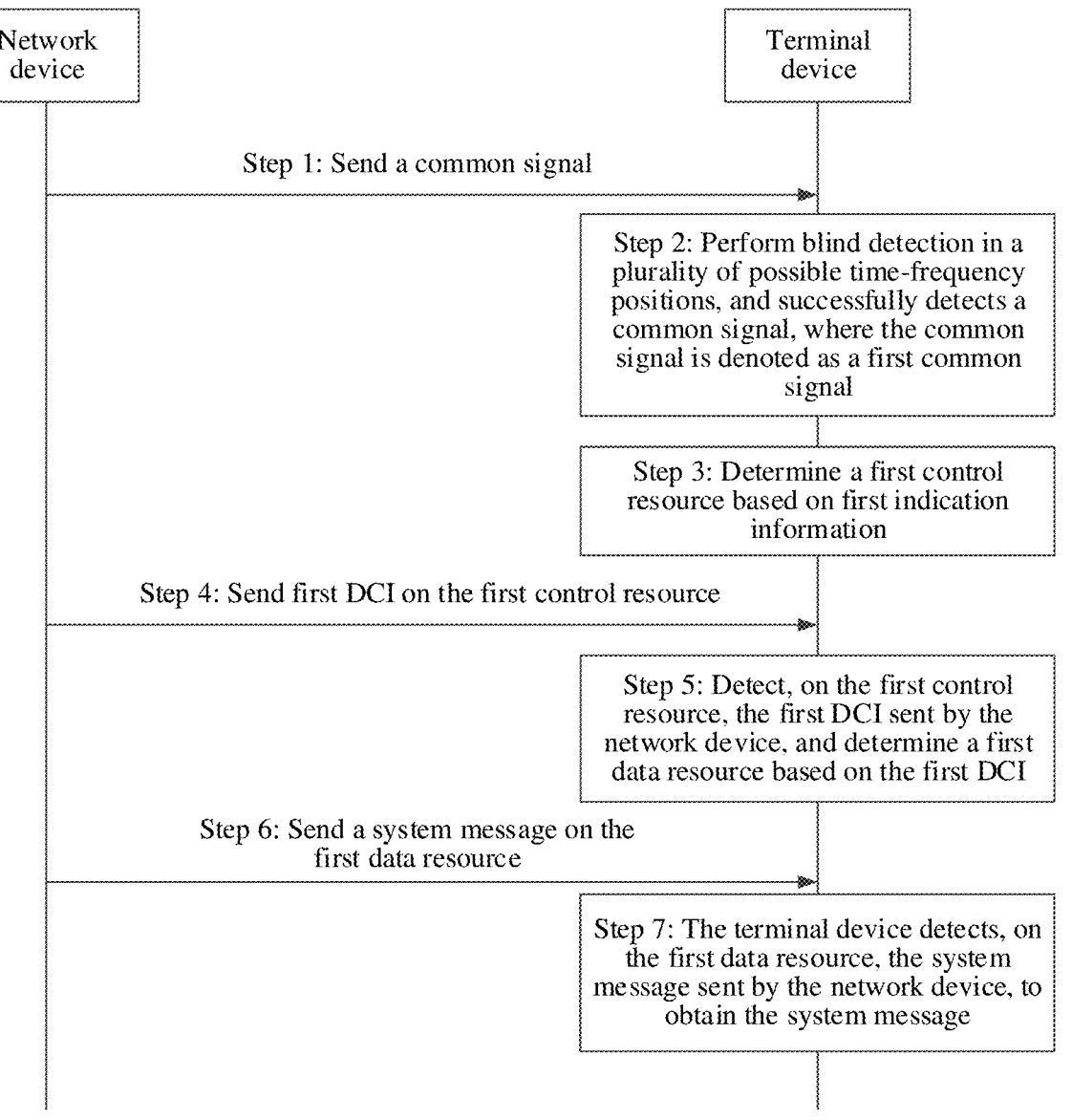
FIG. 10 is an overview flowchart of a communication method according to an embodiment of this application.

Information interaction between a network device and a terminal device is shown in FIG. 10.

Step 1: The network device sends a common signal.

Step 2: The terminal device performs blind detection in a plurality of possible time-frequency positions, and successfully detects a common signal. The common signal is denoted as a first common signal.

Common signals sent by the network device include the first common signal. The first common signal belongs to a first set, the first set includes at least two common signals whose frequency positions are different, and the first common signal carries first indication information. The first indication information is used to determine a first control resource.

The network device may send the common signal in different patterns. A pattern of the common signal includes a pattern of the first set. The pattern of the first set defines a time-frequency position of each common signal in the first set and an index of each common signal in the first set. The pattern of the first set corresponds to one time domain periodicity and one frequency domain unit. The time-frequency position of each common signal in the first set may be a relative time-frequency position of the common signal in the time domain periodicity and the frequency domain unit. The pattern of the first set is predefined, or is indicated by using first information. For example, patterns of a plurality of common signals are predefined, each pattern corresponds to one pattern index, and the first information may indicate a pattern index corresponding to the pattern of the first set. For example, the first set includes the first common signal and a second common signal. A frequency domain position of the first common signal is different from a frequency domain position of the second common signal, and an index of the first common signal in the first set is different from an index of the second common signal in the first set. The index of the first common signal in the first set indicates a sequence number of the first common signal in the pattern of the first set. The index of the second common signal in the first set indicates a sequence number of the second common signal in the pattern of the first set.

Step 3: The terminal device determines the first control resource based on the first indication information.

Step 4: The network device sends first DCI on the first control resource.

Step 5: The terminal device detects, on the first control resource, the first DCI sent by the network device, and determines a first data resource based on the first DCI. The first DCI is used to schedule a system message. The first data resource is used to carry the system message.

In an example, when the terminal device detects the first DCI, it is assumed that there is a first association relationship between transmission of the first DCI and the first common signal. The first association relationship indicates that a channel on which the first DCI is transmitted and a channel on which the first common signal is transmitted are the same in at least one of large-scale fading, a delay spread, an average delay, a Doppler frequency shift, and a Doppler spread.

In another example, when the terminal device detects the first DCI, it is assumed that there is a second association relationship between transmission of the first DCI and the first common signal. The second association relationship indicates that a spatial domain parameter used by the terminal device to receive the first DCI is the same as a spatial domain parameter used by the terminal device to receive the first common signal. For example, the spatial domain parameter herein may include an analog beam, a multi-antenna equalization vector, or the like.

Step 6: The network device sends the system message on the first data resource.

Step 7: The terminal device detects, on the first data resource, the system message sent by the network device, to obtain the system message.

In an example, when the terminal device detects the system message, it is assumed that there is a third association relationship between transmission of the system message and the first common signal. The third association relationship indicates that a channel on which the system message is transmitted and the channel on which the first common signal is transmitted are the same in at least one of large-scale fading, a delay spread, an average delay, a Doppler frequency shift, and a Doppler spread.

In another example, when the terminal device detects the system message, it is assumed that there is a fourth association relationship between transmission of the system message and the first common signal. The fourth association relationship indicates that a spatial domain parameter used by the terminal device to receive the system message is the same as the spatial domain parameter used by the terminal device to receive the first common signal. For example, the spatial domain parameter herein may include an analog beam, a multi-antenna equalization vector, or the like.

In an FDM transmission scenario for a plurality of common signals using the foregoing method, common signals in different frequency domain positions may indicate that respective corresponding indication information is flexibly associated with control resources, for example, control resources in a same position or in different positions, so that the control resources can be easily and flexibly indicated. The terminal device detects the DCI on the determined control resource, and receives the system message based on the detected DCI.

The following describes in detail step 3 in which the terminal device determines the first control resource based on the first indication information. It may be understood that the following implementations are merely examples, and are not intended as a limitation on this embodiment of this application.

It should be noted that, the first indication information may indicate specific information by using a MIB carried on a PBCH in the first common signal. For example, the MIB includes corresponding signaling to directly indicate the information. Alternatively, the information may be implicitly indicated by using a synchronization signal in the first common signal and a DMRS in the PBCH, for example, implicitly determined by using a cyclic offset of a sequence corresponding to the first common signal or a root sequence number, or may be determined by using a time-frequency position of the detected first common signal.

For example, after detecting the first common signal, the terminal device may determine the index of the first common signal in the first set. Optionally, the index of the first common signal in the first set may be indicated by the first indication information. Optionally, the index includes a time domain index and a frequency domain index. The frequency domain index is used to determine a relative frequency domain position of the first common signal in the first set, and the time domain index is used to determine a relative time domain position of the first common signal in the first set. For example, the first set includes N common signals.

There are N1 frequency domain positions and N2 time domain positions of the N common signals. N1*N2>=N. The frequency domain index may be a number from 1 to N1 (or a number from 0 to (N1−1)). The time domain index may be a number from 1 to N2 (or a number from 0 to (N2−1)). Optionally, the index includes a time domain index and a time-frequency index. A meaning of the time domain index is the same as that described above. The time-frequency index is used to determine a relative time domain position and a relative frequency domain position of the first common signal in the first set. For example, the first set includes N common signals, numbered from 1 to N (or 0 to (N−1)). Each numbered common signal corresponds to a time-frequency position (determined by a pattern of the common signal). Optionally, the index includes a frequency domain index and a time-frequency index, and meanings of the frequency domain index and the time-frequency index are the same as those described above. N, N1, and N2 are all positive integers.

For example, after detecting the first common signal, the terminal device may determine a time domain position of the first common signal. Optionally, the time domain position of the first common signal may be indicated by the first indication information. The first indication information is equivalent to implicit information. The terminal device blindly detects the first common signal. A time domain position in which the terminal device detects the first common signal is the time domain position of the first common signal.

For example, after detecting the first common signal, the terminal device may determine a frequency domain position of the first common signal. Optionally, the frequency domain position of the first common signal may be indicated by the first indication information. The first indication information is equivalent to implicit information. The terminal device blindly detects the first common signal. A frequency domain position in which the terminal device detects the first common signal is the frequency domain position of the first common signal.

When the first indication information indicates a plurality of pieces of information/a plurality of parameters, the first indication information may include a plurality of pieces of sub information, and each piece of sub information indicates one piece of information/one parameter. For example, when the first indication information indicates both the frequency domain position of the first common signal and a frequency offset, the first indication information may include two parts, that is, two pieces of sub information. First sub information is implicit information. That is, the terminal device blindly detects the first common signal. A frequency domain position in which the terminal device detects the first common signal is the frequency domain position of the first common signal. Second sub information may be explicit information, and directly indicates the frequency offset.

In a first aspect, the terminal device may determine a frequency domain position of the first control resource based on the first indication information in, but not limited to, the following manners:

Manner 1: The terminal device determines the frequency domain position of the first control resource based on the frequency domain position of the first common signal and a first frequency offset. For example, frequency domain position of the first control resource=frequency domain position of the first common signal−first frequency offset. In this manner, the terminal device may directly determine a frequency domain position of a control resource based on a frequency domain position of a detected common signal and a relative frequency offset without completing absolute synchronization of downlink frequencies. This implementation is simple and efficient.

For example, the first indication information indicates the frequency domain position of the first common signal, and the first frequency offset is predefined. Alternatively, the first indication information indicates the frequency domain position of the first common signal and the first frequency offset.

The first indication information may indicate the first frequency offset by using, but not limited to, the following possible designs.

In a possible design, the first frequency offset may be carried in a MIB in the first common signal, that is, carried in system information in the first common signal.

In another possible design, an information bit carried on a PBCH includes the MIB, and further includes some physical layer bits. The MIB in NR corresponds to a system parameter of an access cell, and it may be inconvenient to dynamically change the system parameter. Therefore, the first frequency offset may be indicated by a physical layer bit. For example, the MIB indicates a basic frequency offset, the physical layer bit indicates a variable frequency domain offset, and first frequency offset=basic frequency offset+variable frequency domain offset. Alternatively, the MIB indicates the basic frequency offset, and the variable frequency domain offset is implicitly indicated by a synchronization signal and a DMRS sequence of the PBCH, to avoid modification of the MIB.

In addition, in an example, the first set includes the first common signal and the second common signal. The frequency domain position of the first common signal is different from the frequency domain position of the second common signal. The terminal device determines a frequency domain position of a second control resource based on the frequency domain position of the second common signal and a second frequency offset. The first frequency offset may be the same as or different from the second frequency offset.

Figure 11:
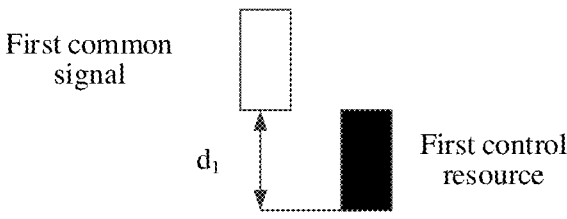
FIG. 11 is a schematic diagram of a first control resource and a second control resource in the case that a first frequency offset is the same as a second frequency offset according to an embodiment of this application.
Figure 11:
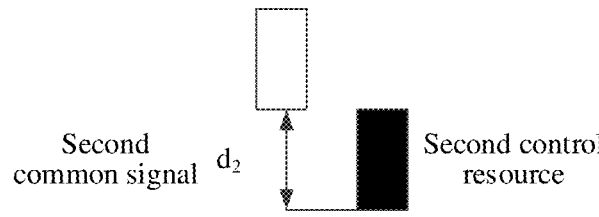

For example, the first frequency offset is represented by $d_1$, and the second frequency offset is represented by $d_2$. As shown in FIG. 11, if $d_2=d_1$, the frequency domain position of the second control resource is different from the frequency domain position corresponding to the first control resource. In this manner, different common signals only need to indicate a same frequency offset, and the frequency offset may be indicated by one information element in MIB information, to ensure stability of the MIB information.

Figure 12:
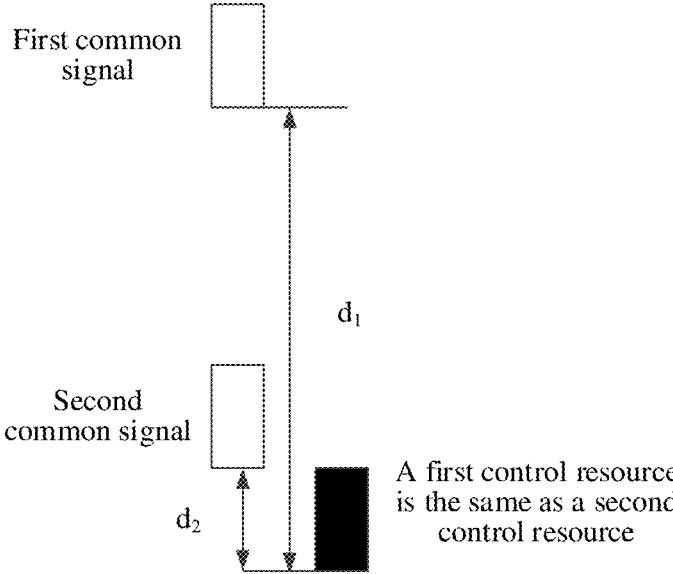
FIG. 12 is a schematic diagram of a first control resource and a second control resource in the case that a first frequency offset is different from a second frequency offset according to an embodiment of this application.

For another example, the first frequency offset is represented by $d_1$, and the second frequency offset is represented by $d_2$. As shown in FIG. 12, if $d_2 \neq d_1$, the frequency domain position of the second control resource may be the same as or different from the frequency domain position corresponding to the first control resource. When the frequency domain position of the second control resource is the same as the frequency domain position corresponding to the first control resource, $d_2=d_1+$(frequency domain position of the second common signal-frequency domain position of the first common signal). In this manner, different common signals may carry different frequency offsets, to improve indication flexibility.

Manner 2: The terminal device determines a frequency domain position of a reference common signal based on the frequency domain position of the first common signal. The first set includes the reference common signal. The terminal device determines the frequency domain position of the first control resource based on the frequency domain position of the reference common signal and a first frequency offset. In this manner, the frequency domain position of the first control resource can be determined based on a fixed reference common signal and a frequency offset. This implementation is simple and efficient.

Optionally, the reference common signal is a preset common signal in the first set, for example, a common signal with a smallest frequency corresponding to a frequency domain position, or a common signal whose index is 0 in the first set.

For example, the first indication information indicates the frequency domain position of the first common signal, and the first frequency offset is predefined. Alternatively, the first indication information indicates the frequency domain position of the first common signal and the first frequency offset. For description of indicating the first frequency offset by the first indication information, refer to related content in Manner 1. Details are not described again.

In some embodiments, the terminal device may determine the frequency domain position of the reference common signal based on the frequency domain position of the first common signal, the index of the first common signal in the first set, an index of the reference common signal in the first set, and the pattern of the first set.

The terminal device first determines the pattern of the first set, further determines the index of the first common signal in the first set and the index of the reference common signal in the first set, and further obtains a difference between the frequency domain position of the first common signal and the frequency domain position of the reference common signal. Then, the terminal device determines the frequency domain position of the reference common signal based on the frequency domain position of the first common signal and the difference between the frequency domain position of the first common signal and the frequency domain position of the reference common signal. The pattern of the first set may be indicated by the first information or predefined. The index of the first common signal in the first set may be indicated by the first indication information. The index of the reference common signal in the first set may be preset, or may be indicated by the first indication information.

Figure 13:
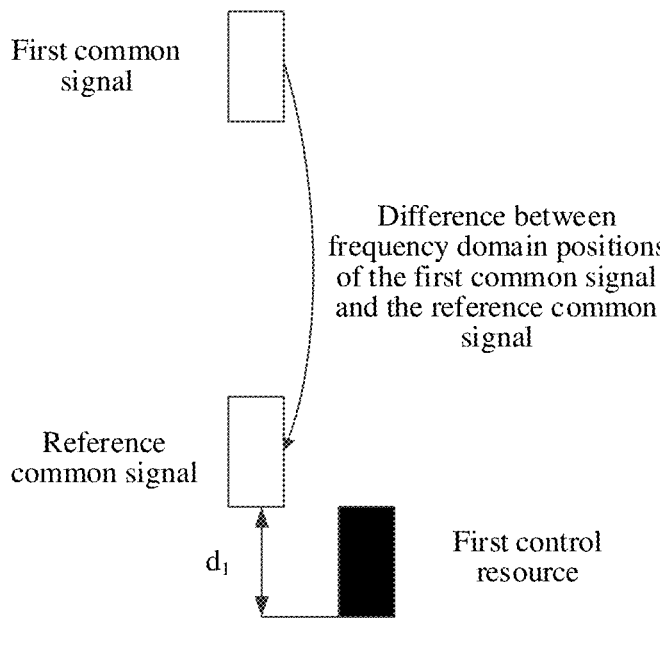
FIG. 13 is a schematic diagram of determining a frequency domain position of a first control resource based on a frequency domain position of a reference common signal and a first frequency offset according to an embodiment of this application.

As shown in FIG. 13, the terminal device first determines the pattern of the first set, further determines the index of the first common signal in the first set and the index of the reference common signal in the first set, and further obtains the difference between the frequency domain position of the first common signal and the frequency domain position of the reference common signal. Then, the terminal device determines the frequency domain position of the reference common signal based on the frequency domain position of the first common signal and the difference between the frequency domain position of the first common signal and the frequency domain position of the reference common signal. Further, the terminal device determines the frequency domain position of the first control resource based on the frequency domain position of the reference common signal and the first frequency offset.

Manner 3: The terminal device determines the frequency domain position of the first control resource based on a frequency domain index (referred to as a first frequency domain index for short) of the first common signal in the first set. The frequency domain index is used to determine a relative frequency domain position of the first common signal in the first set. For example, the terminal device determines a first parameter based on the first frequency domain index. The first parameter indicates an absolute frequency of the frequency domain position of the first control resource, or a relative distance between the frequency domain position of the first control resource and the frequency domain position of the first common signal. Alternatively, the terminal device determines a frequency domain index of the first control resource based on the first frequency domain index, and determines the frequency domain position of the first control resource based on the frequency domain index of the first control resource. In this manner, the terminal device determines the frequency domain position of the first control resource based on the first frequency domain index. This implementation is simple and efficient.

Optionally, the terminal device not only obtains the frequency domain index of the first common signal in the first set, but also obtains a time domain index or a time-frequency index of the first common signal in the first set. However, the terminal device determines the frequency domain position of the first control resource based on only the frequency domain index.

For example, the terminal device determines an association relationship (referred to as a frequency domain association relationship for short below) between a frequency domain index set (referred to as a first index set for short below) of the first set and a frequency domain index set (referred to as a second index set for short below) of the first control resource. The terminal device may determine the frequency domain index of the first control resource by using the frequency domain index of the first common signal in the first set and the frequency domain association relationship, and then determine the frequency domain position of the first control resource based on the frequency domain index of the first control resource. The first index set, the second index set, the frequency domain association relationship, and the frequency domain position corresponding to the frequency domain index of the first control resource may be predefined or indicated by the first indication information, and the frequency domain index of the first common signal in the first set may be indicated by the first indication information.

Manner 4: The terminal device determines the frequency domain position of the first control resource based on a time-frequency index (referred to as a first time-frequency index for short) of the first common signal in the first set. The time-frequency index is used to determine a relative frequency domain position and a relative time domain position of the first common signal in the first set. For example, the terminal device determines a second parameter based on the first time-frequency index. The second parameter indicates an absolute frequency of the frequency domain position of the first control resource, or a relative distance between the frequency domain position of the first control resource and the frequency domain position of the first common signal. Alternatively, the terminal device determines a frequency domain index of the first control resource based on the first time-frequency index, and determines the frequency domain position of the first control resource based on the frequency domain index of the first control resource. In this manner, the terminal device determines the frequency domain position of the first control resource based on the first time-frequency index. This implementation is simple and efficient.

In a second aspect, the terminal device may determine a time domain position of the first control resource based on the first indication information in, but not limited to, the following manners:

Manner 1: The terminal device determines the time domain position of the first control resource based on the time domain position of the first common signal and a first time offset. For example, time domain position of the first control resource=time domain position of the first common signal+first time offset. In this manner, the terminal device may directly determine a time domain position of a control resource based on a time domain position of a detected common signal and a relative time offset. This implementation is simple and efficient.

For example, the first indication information indicates the time domain position of the first common signal, and the first time offset is predefined. Alternatively, the first indication information indicates the time domain position of the first common signal and the first time offset. For description of indicating the first time offset by the first indication information, refer to related content in Manner 1 in the first aspect. Details are not described again.

In addition, in an example, the first set includes the first common signal and a third common signal. The time domain position of the first common signal is different from a time domain position of the third common signal. The frequency domain position of the first common signal is different from a frequency domain position of a fourth common signal. The terminal device may determine a time domain position of a second control resource based on the time domain position of the third common signal and the second time offset. The first time offset may be the same as or different from a third time offset.

For example, the first time offset is represented by t1, and the third time offset is represented by t3. If t1=t3, a time domain position of a third control resource is different from the time domain position corresponding to the first control resource. In this manner, different common signals only need to indicate a same time offset, and the time offset may be indicated by one information element in MIB information, to ensure stability of the MIB information.

For another example, the first time offset is represented by t1, and the third time offset is represented by t3. If t1≠t3, a time domain position of a third control resource may be the same as or different from the time domain position corresponding to the first control resource. When the time domain position of the third control resource is the same as the time domain position corresponding to the first control resource, t3=t1+(time domain position of the third common signal-time domain position of the first common signal). In this manner, different common signals may carry different time offsets, to improve indication flexibility.

In another example, the first set includes the first common signal and a fourth common signal. The time domain position of the first common signal is the same as a time domain position of the fourth common signal. The frequency domain position of the first common signal is different from a frequency domain position of the fourth common signal. The terminal device determines a time domain position of a fourth control resource based on the time domain position of the fourth common signal and a fourth time offset. The first time offset may be the same as or different from the fourth time offset.

For example, the first time offset is represented by t1, and the fourth time offset is represented by t4. If t1=t4, the time domain position of the fourth control resource is the same as the time domain position corresponding to the first control resource. In this manner, different common signals only need to indicate a same time offset, and the time offset may be indicated by one information element in MIB information, to ensure stability of the MIB information.

For example, the first time offset is represented by t1, and the fourth time offset is represented by t4. If t1≠t4, the time domain position of the fourth control resource is different from the time domain position corresponding to the first control resource. In this manner, different common signals may carry different time offsets, to improve indication flexibility.

In still another example, the first set includes the first common signal and a fifth common signal. The time domain position of the first common signal is different from a time domain position of the fifth common signal. The frequency domain position of the first common signal is the same as a frequency domain position of the fifth common signal. The terminal device determines a time domain position of a fifth control resource based on the time domain position of the fifth common signal and a fifth time offset. The first time offset may be the same as or different from the fifth time offset.

For example, the first time offset is represented by t1, and the fifth time offset is represented by t5. If t1=t5, the time domain position of the fifth control resource is different from the time domain position corresponding to the first control resource. In this manner, different common signals only need to indicate a same time offset, and the time offset may be indicated by one information element in MIB information, to ensure stability of the MIB information.

For example, the first time offset is represented by t1, and the fifth time offset is represented by t5. If t1≠t5, the time domain position of the fifth control resource may be the same as or different from the time domain position corresponding to the first control resource. When the time domain position of the fifth control resource is the same as the time domain position corresponding to the first control resource, t5=t1+(time domain position of the fifth common signal-time domain position of the first common signal). In this manner, different common signals may carry different time offsets, to improve indication flexibility.

Manner 2: The terminal device determines a second time offset based on the frequency domain position/a frequency domain position index of the first common signal, and then determines a time domain configuration of the first control resource based on the time domain position of the first common signal, a first time offset, and the second time offset. For example, if the frequency domain index of the first common signal is i, and the second time offset is determined as $t_{2,i}$, the time domain position of the first control resource=time domain position of the first common signal+first time offset+$t_{2,i}$.

Alternatively, the terminal device determines the second time offset based on the frequency domain position/frequency domain position index of the first common signal and the first time offset, for example, $t_2=t_1+t_{2,i}$, where $t_{2,i}$ is determined based on the frequency domain position/frequency domain position index of the first common signal. Then, the terminal device determines the time domain position of the first control resource based on the time domain position of the first common signal and the second time offset.

In this manner, the terminal device determines the time domain position of the first control resource based on the frequency domain position/frequency domain position of the first common signal. This implementation is simple and efficient.

Manner 3: The terminal device determines the time domain position of the first control resource based on a time domain index (referred to as a first time domain index for short) of the first common signal in the first set. The time domain index is used to determine a relative time domain position of the first common signal in the first set. For example, the terminal device determines a third parameter based on the first time domain index. The third parameter indicates an absolute number (a number of at least one of a radio frame, a subframe, a slot, and a unit in which the first control resource is located) of the time domain position of the first control resource, or a relative distance between the time domain position of the first control resource and the time domain position of the first common signal. Alternatively, the terminal device determines a time domain index of the first control resource based on the first time domain index, and determines the time domain position of the first control resource based on the time domain index of the first control resource. In this manner, the terminal device determines the time domain position of the first control resource based on the first time domain index. This implementation is simple and efficient.

Optionally, the terminal device not only obtains the time domain index of the first common signal in the first set, but also obtains a frequency domain index or a time-frequency index of the first common signal in the first set. However, the terminal device determines the time domain position of the first control resource based on only the time domain index.

For example, the first time domain index is i, and the terminal device determines, based on the first time domain index, that a number of a slot in which the first control resource is located is $$n_0 = f(i). \text{ For example, } f(i) = (O \times 2^\mu + \lfloor i \times M \rfloor) \bmod N_{slot}^{frame,\mu}.$$

Meanings of O, μ, M, and $$N_{slot}^{frame,\mu}$$

are the same as those described above.

For example, the terminal device determines an association relationship (referred to as a time domain association relationship for short below) between a time domain index set (referred to as a third index set for short below) of the first set and a time domain index set (referred to as a fourth index set for short below) of the first control resource. The terminal device may determine the time domain index of the first control resource by using the time domain index of the first common signal in the first set and the time domain association relationship, and then determine the time domain position of the first control resource based on the time domain index of the first control resource. The third index set, the fourth index set, the time domain association relationship, and the time domain position corresponding to the time domain index of the first control resource may be predefined or indicated by the first indication information, and the time domain index of the first common signal in the first set may be indicated by the first indication information.

Manner 4: The terminal device determines the time domain position of the first control resource based on a time-frequency index (referred to as a first time-frequency index for short) of the first common signal in the first set. The time-frequency index is used to determine a relative frequency domain position and a relative time domain position of the first common signal in the first set. For example, the terminal device determines a fourth parameter based on the first time-frequency index. The fourth parameter indicates an absolute number (a number of at least one of a radio frame, a subframe, a slot, and a unit in which the first control resource is located) of the time domain position of the first control resource, or a relative distance between the time domain position of the first control resource and the time domain position of the first common signal. Alternatively, the terminal device determines a time domain index of the first control resource based on the first time-frequency index, and determines the time domain position of the first control resource based on the time domain index of the first control resource. In this manner, the terminal device determines the time domain position of the first control resource based on the first time-frequency index. This implementation is simple and efficient.

For example, the first time domain index is i, and the terminal device determines, based on the first time domain index, that a number of a slot in which the first control resource is located is $n_0=f(g(i))$. A meaning of f(x) is the same as that described above. g(i) indicates that simple processing is first performed on the index i, for example, g(i)=i/M1 or g(i)=i mod M2. M1 is a preset value, and may be predefined or indicated by a common signal. For example, M1 is a quantity of frequency domain positions of common signals in the first set. M2 is a preset value, and may be predefined or indicated by a common signal. For example, M2 is a quantity of time domain positions of common signals in the first set.

In a third aspect, the terminal device may determine a time-frequency position of the first control resource based on the first indication information in, but not limited to, the following manners:

The terminal device determines an association relationship (referred to as a time-frequency association relationship for short below) between a time-frequency index set (referred to as a fifth index set for short below) of the first set and a time-frequency index set (referred to as a sixth index set for short below) of the first control resource. A time-frequency index of the first common signal is used to determine a relative time-frequency position of a common signal in the first set. The terminal device may determine a time-frequency index of the first control resource based on the time-frequency index of the first common signal in the first set and the time-frequency association relationship, and then determine the time-frequency position of the first control resource based on the time-frequency index of the first control resource. The fifth index set, the sixth index set, the time-frequency association relationship, and the time-frequency position corresponding to the time-frequency index of the first control resource may be predefined or indicated by the first indication information, and the time-frequency index of the first common signal in the first set may be indicated by the first indication information. According to the foregoing method, the terminal device may determine the time-frequency position of the first control resource based on the time-frequency association relationship.

A plurality of time-frequency positions of the first control resource may be determined based on the time-frequency index of the first control resource. The terminal device may detect the first DCI on one or more first control resources.

In addition, in some embodiments, the network device still notifies a time domain index of a common signal (for example, an SSB), and the terminal device supporting the NR system may determine a time domain position of a control resource based on the time domain index, and then may further determine a frequency domain position of the control resource based on a frequency domain position of the common signal. For details, refer to related content of Manner 1 and Manner 2 of the first aspect. Repeated parts are not described again. In this framework, the network device modifies a value of a frequency offset, so that frequency domain positions of control resources corresponding to two FDM-ed common signals are different or the same, to implement flexibility of frequency domain positions of control resources. Alternatively, the network device modifies a value of the frequency offset, so that two FDM-ed common signals correspond to different sub-resources in a control resource in one frequency domain position.

In some embodiments, the terminal device supporting the NR system may determine a time domain position of a control resource based on a time domain index of the common signal, or may determine a frequency domain position of the control resource based on a frequency domain index of the common signal. For details, refer to related content in Manner 3 of the first aspect. Time domain positions of control resources corresponding to two FDM-ed common signals (and in a same time domain position) may be different or the same.

For example, considering backward compatibility, there may be the following four possible solutions.

Solution 1: Two FDM-ed common signals correspond to two FDM-ed control resources, and two TDM-ed common signals correspond to two TDM-ed control resources.

Optionally, the terminal device first detects the first common signal, and determines the time domain index of the first common signal. For example, the time domain index of the first common signal may be an existing SSB index in the NR system. Then, the terminal device determines the time domain position of the first control resource based on the time domain index, and determines the frequency domain position of the first control resource based on the frequency domain position of the first common signal and the first frequency offset. When frequency offsets corresponding to two FDM-ed common signals are the same, the two FDM-ed common signals correspond to two FDM-ed control resources. The two TDM-ed common signals correspond to the two TDM-ed control resources.

Figure 14:
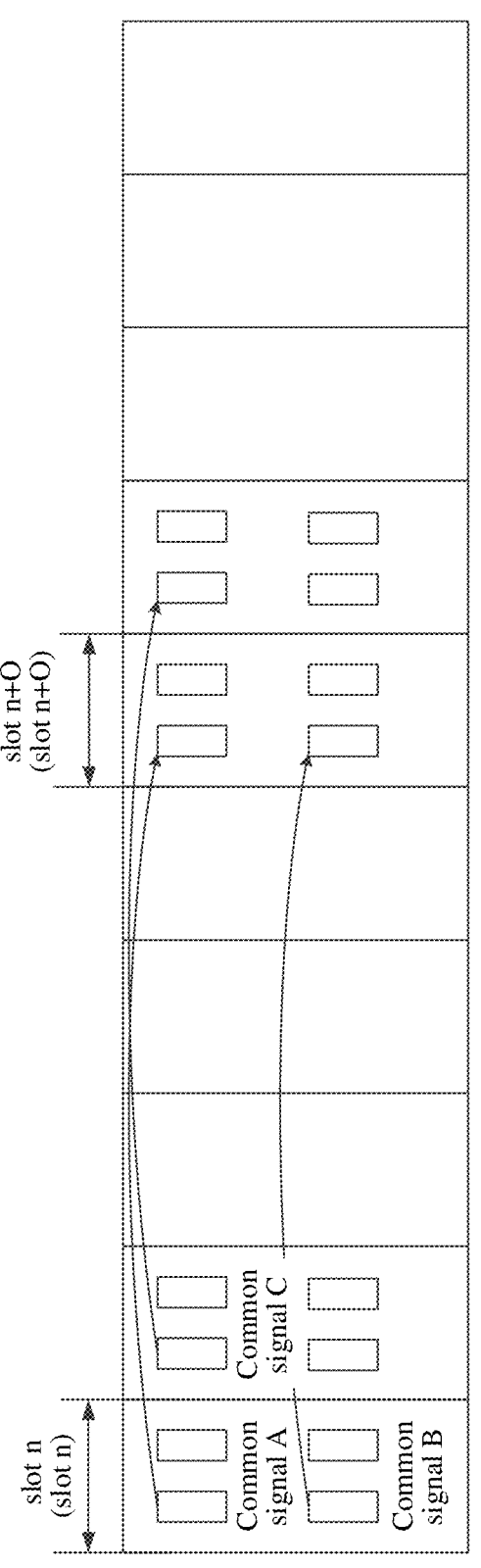
FIG. 14 is a schematic diagram 1 of a correspondence between a control resource and a common signal according to an embodiment of this application.

As shown in FIG. 14, a common signal A and a common signal B are two FDM-ed common signals. When frequency offsets corresponding to the common signal A and the common signal B are the same, a frequency domain position of a control resource corresponding to the common signal A is different from a frequency domain position of a control resource corresponding to the common signal B. That is, the control resource corresponding to the common signal A is different from the control resource corresponding to the common signal B. The common signal A and a common signal C are two TDM-ed common signals, and the control resource corresponding to the common signal A is different from a control resource corresponding to the common signal C. It may be understood that the common signal A, the common signal B, and the common signal C are common signals of a same type.

In addition, when the terminal device detects DCI on a control resource, it is assumed that there is a first association relationship and/or a second association relationship between transmission of the DCI and transmission of a corresponding common signal. Subsequently, SIBs 1 sent by the network device in different frequency domain positions indicate two different frequency offsets, which are respectively equal to distances between frequency domain positions of the two FDM-ed common signals and the absolute frequency domain position point A.

It should be noted herein that the terminal device first detects the first common signal. In addition to determining the time domain index of the first common signal, the terminal device may further determine the frequency domain index or the time-frequency joint index of the first common signal, that is, a sequence number of the first common signal in a pattern of the first common signal. However, the terminal device determines the time domain position of the first control resource based on only the time domain index of the common signal.

Solution 2: Two FDM-ed common signals correspond to one control resource, and two TDM-ed common signals correspond to two TDM-ed control resources.

Optionally, the terminal device first detects the first common signal, and determines the time domain index of the first common signal. For example, the time domain index of the first common signal may be an existing SSB index in the NR system. Then, the terminal device determines the time domain position of the first control resource based on the time domain index, and determines the frequency domain position of the first control resource based on the frequency domain position of the first common signal and the first frequency offset. The two FDM-ed common signals correspond to different frequency offsets. That is, the two FDM-ed common signals indicate different frequency offsets. For example, frequency offset corresponding to the second common signal=frequency offset corresponding to the first common signal+(frequency domain position of the second common signal-frequency domain position of the first common signal). In this way, the two FDM-ed common signals correspond to one control resource. The two TDM-ed common signals correspond to the two TDM-ed control resources.

Figure 15:
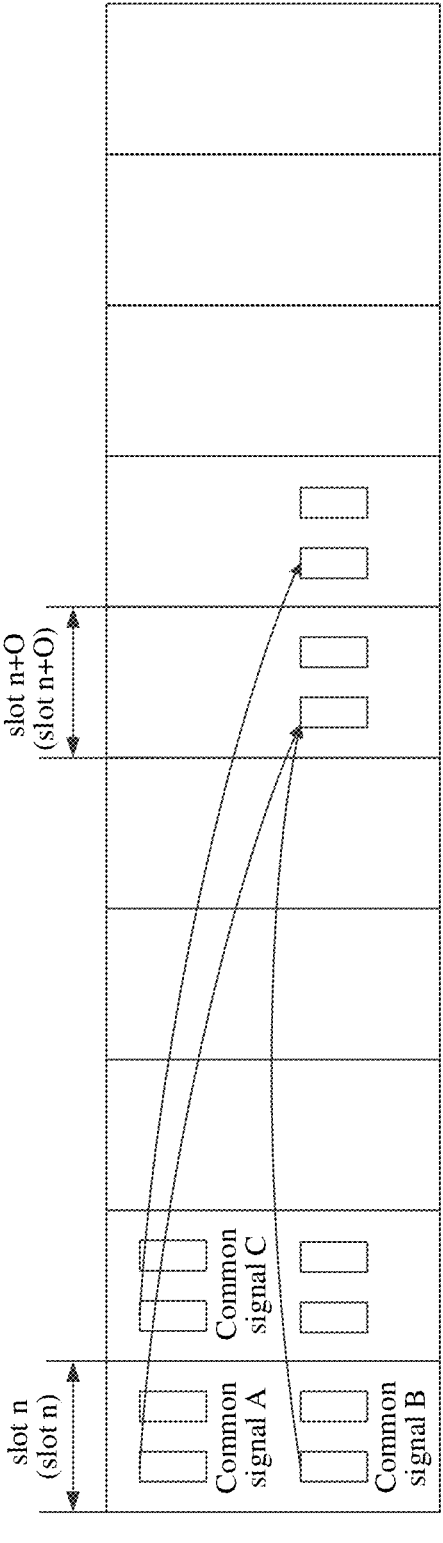
FIG. 15 is a schematic diagram 2 of a correspondence between a control resource and a common signal according to an embodiment of this application.

As shown in FIG. 15, a common signal A and a common signal B are two FDM-ed common signals. When frequency offsets corresponding to the common signal A and the common signal B are different, a frequency domain position of a control resource corresponding to the common signal A may be the same as a frequency domain position of a control resource corresponding to the common signal B, and a time domain position of the control resource corresponding to the common signal A may be the same as a time domain position of the control resource corresponding to the common signal B. That is, the control resource corresponding to the common signal A may be the same as the control resource corresponding to the common signal B. The common signal A and a common signal C are two TDM-ed common signals, and the control resource corresponding to the common signal A is different from a control resource corresponding to the common signal C. It may be understood that the common signal A, the common signal B, and the common signal C are common signals of a same type.

For example, when the terminal device detects DCI on one control resource, it is assumed that there is a first association relationship and/or a second association relationship between transmission of the DCI and transmission of a plurality of corresponding FDM-ed common signals. A receiving behavior of a specific common signal used by the UE to receive the DCI is sent to the terminal device for implementation, or the terminal device uses a plurality of antenna array boards and/or a plurality of transceiver channels, and a receiving behavior of each array board/transceiver channel is set to match a common signal.

It should be noted herein that the terminal device first detects the first common signal. In addition to determining the time domain index of the first common signal, the terminal device may further determine the frequency domain index or the time-frequency joint index of the first common signal, that is, a sequence number of the first common signal in a pattern of the first common signal. However, the terminal device determines the time domain position of the first control resource based on only the time domain index of the common signal.

Solution 3: Two FDM-ed common signals A correspond to two control resources, but have a same frequency domain position and different time domain positions. Two TDM-ed common signals A correspond to two TDM-ed control resources.

Optionally, the terminal device first detects the first common signal, and determines the time domain index of the first common signal, that is, an existing SSB index in the NR system. The terminal device supporting the NR system determines the frequency domain index or the time-frequency joint index of the first common signal, and then determines the time domain position of the first control resource based on the time domain index and the frequency domain index or the time-frequency joint index. Different time-frequency joint indexes correspond to different time domain positions. The terminal device determines the frequency domain position of the first control resource based on the frequency domain position of the first common signal and the first frequency offset. Herein, frequency offsets corresponding to two FDM-ed common signals are different. That is, the two FDM-ed common signals indicate different frequency offsets. For example, frequency offset corresponding to the second common signal=frequency offset corresponding to the first common signal+(frequency domain position of the second common signal-frequency domain position of the first common signal)

Figure 16:
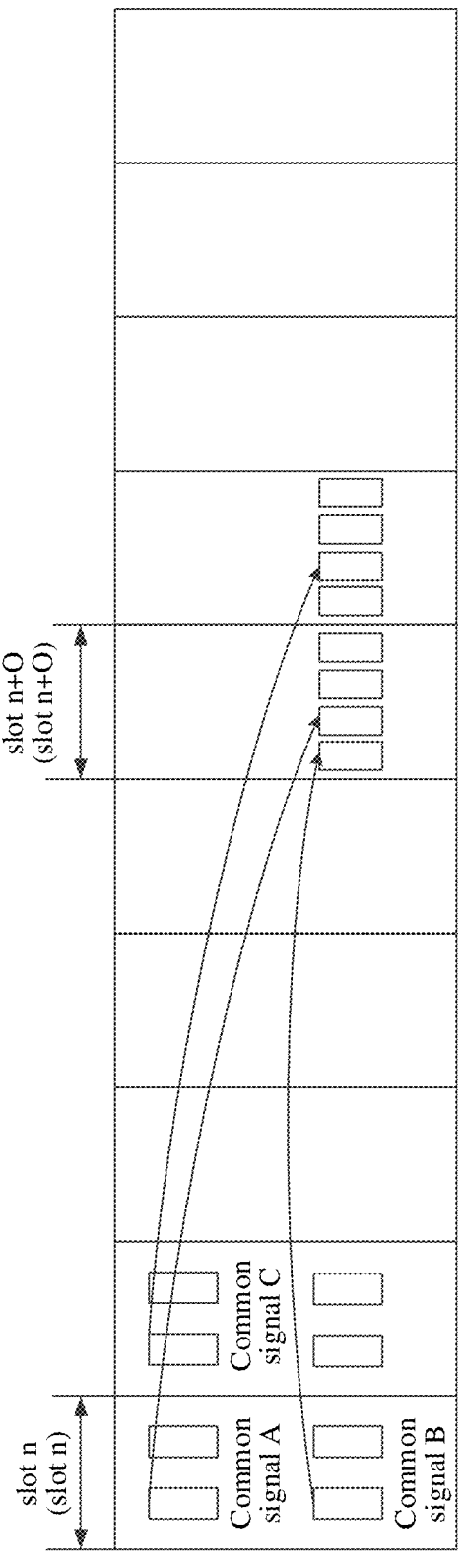
FIG. 16 is a schematic diagram 3 of a correspondence between a control resource and a common signal according to an embodiment of this application.

As shown in FIG. 16, a common signal A and a common signal B are two FDM-ed common signals. When frequency offsets corresponding to the common signal A and the common signal B are different, a frequency domain position of a control resource corresponding to the common signal A may be the same as a frequency domain position of a control resource corresponding to the common signal B, but a time domain position of the control resource corresponding to the common signal A may be different from a time domain position of the control resource corresponding to the common signal B. That is, the control resource corresponding to the common signal A is different from the control resource corresponding to the common signal B. The common signal A and a common signal C are two TDM-ed common signals, and the control resource corresponding to the common signal A is different from a control resource corresponding to the common signal C. It may be understood that the common signal A, the common signal B, and the common signal C are common signals of a same type.

Solution 4: Two FDM-ed common signals correspond to one control resource but correspond to different sub-control resources in the control resource, and two TDM-ed common signals A correspond to two TDM-ed control resources.

Optionally, the terminal device first detects the first common signal, and determines the time domain index of the first common signal, that is, an existing SSB index in the NR system. Then, the terminal device determines the time domain position of the first control resource based on the time domain index, and determines the frequency domain position of the first control resource based on the frequency domain position of the first common signal and the first frequency offset. The two FDM-ed common signals A correspond to different frequency offsets. That is, the two FDM-ed common signals indicate different frequency offsets. For example, frequency offset corresponding to the second common signal=frequency offset corresponding to the first common signal+(frequency domain position of the second common signal-frequency domain position of the first common signal). In this way, two FDM-ed common signals correspond to one control resource, and two TDM-ed common signals correspond to two TDM-ed control resources.

Further, for at least one sub-resource included in the first control resource, for example, a PDCCH candidate in NR, the terminal device may determine two sub-resource subsets, respectively corresponding to two FDM-ed common signals. For example, assuming that the first control resource includes K aggregation levels, and each aggregation level includes $M_K$ PDCCH candidates, the first common signal and the second common signal may be associated with different aggregation levels, or may be associated with all aggregation levels, but each aggregation level is associated with different PDCCH candidates. In this case, when the terminal device detects DCI on each sub-resource, it is assumed that there is a first association relationship and/or a second association relationship between transmission of the DCI and transmission of a corresponding common signal. Different receiving behaviors may be used to detect the DCI on different sub-resources.

Figure 17:
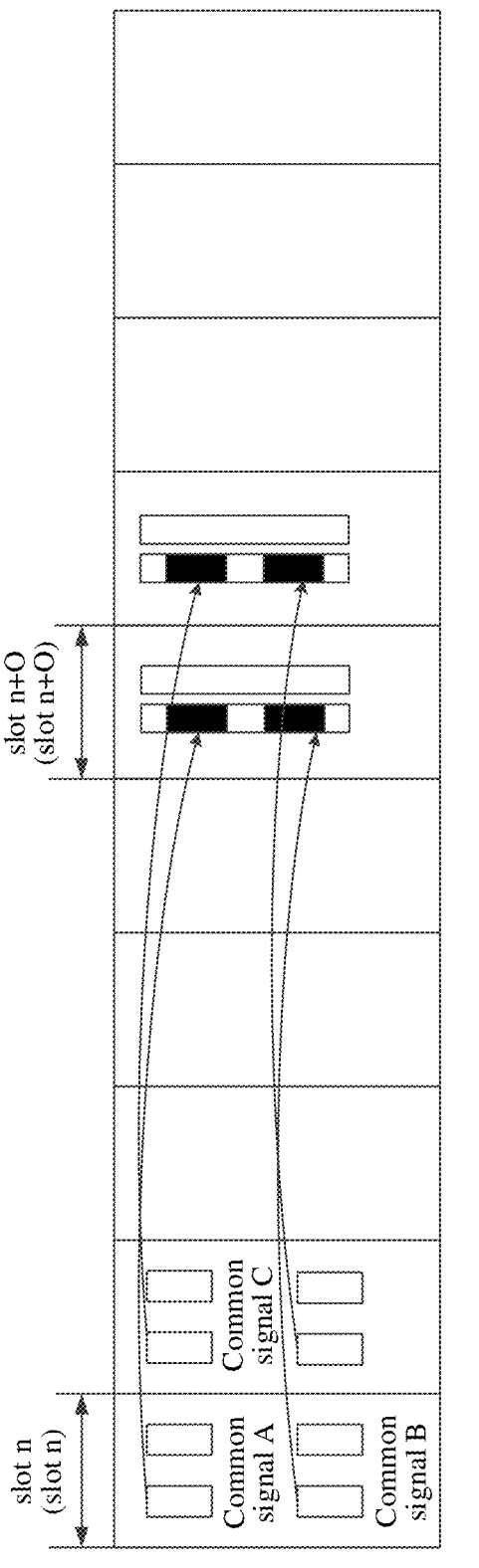
FIG. 17 is a schematic diagram 4 of a correspondence between a control resource and a common signal according to an embodiment of this application.

As shown in FIG. 17, a common signal A and a common signal B are two FDM-ed common signals. When frequency offsets corresponding to the common signal A and the common signal B are different, a frequency domain position (for example, a start position) of a control resource corresponding to the common signal A may be the same as a frequency domain position (for example, a start position) of a control resource corresponding to the common signal B, but a time domain position of the control resource corresponding to the common signal A may be the same as a time domain position of the control resource corresponding to the common signal B. However, a sub-control resource corresponding to the common signal A in the control resource is different from a sub-control resource corresponding to the common signal B in the control resource. The common signal A and a common signal C are two TDM-ed common signals, a time domain position corresponding to the common signal A is different from a time domain position corresponding to the common signal C, and a control resource corresponding to the common signal A is different from a control resource corresponding to the common signal C.

It may be understood that, to implement the functions in the foregoing embodiments, a network device and a terminal device include corresponding hardware structures and/or software modules for performing the functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on a particular application scenario and design constraint of the technical solutions.

Figure 18:
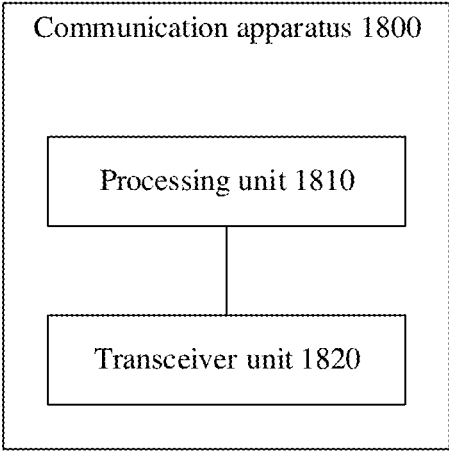
FIG. 18 is a schematic diagram 1 of a structure of a communication apparatus according to an embodiment of this application.
Figure 19:
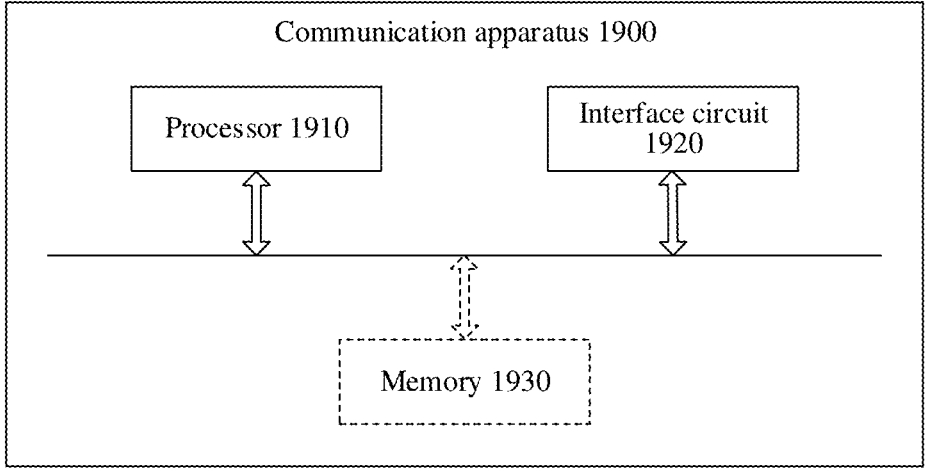
FIG. 19 is a schematic diagram 2 of a structure of a communication apparatus according to an embodiment of this application.

FIG. 18 and FIG. 19 are schematic diagrams of structures of possible communication apparatuses according to an embodiment of this application. The communication apparatus may be configured to implement functions of a terminal device or a network device in the foregoing method embodiment. Therefore, beneficial effects of the foregoing method embodiment can also be implemented. In embodiments of this application, the communication apparatus may be the terminal device 130 or the terminal device 140 shown in FIG. 9, may be the radio access network device 120 shown in FIG. 9, or may be a module (for example, a chip) used in the terminal device or the network device.

As shown in FIG. 18, a communication apparatus 1800 includes a processing unit 1810 and a transceiver unit 1820. The communication apparatus 1800 is configured to implement a function of the terminal device or the network device in the method embodiment shown in FIG. 10.

When the communication apparatus 1800 is configured to implement a function of the terminal device in the method embodiment shown in FIG. 10, the transceiver unit 1820 is configured to detect a first common signal. The first common signal belongs to a first set, and the first set includes at least two common signals whose frequency positions are different. The first common signal carries first indication information. The processing unit 1810 is configured to determine a first control resource based on the first indication information. The transceiver unit 1820 is configured to receive first downlink control information DCI on the first control resource. The first DCI is used to schedule a system message.

When the communication apparatus 1800 is configured to implement a function of the network device in the method embodiment shown in FIG. 10, the processing unit 1810 invokes the transceiver unit 1820 to send a first common signal, where the first common signal belongs to a first set, the first set includes at least two common signals whose frequency positions are different, the first common signal carries first indication information, and the first indication information is used to determine a first control resource; and send first DCI on the first control resource, where the first DCI is used to schedule a system message.

For more detailed descriptions of the processing unit 1810 and the transceiver unit 1820, directly refer to related descriptions in the method embodiment shown in FIG. 10. Details are not described herein again.

As shown in FIG. 19, a communication apparatus 1900 includes a processor 1910 and an interface circuit 1920. The processor 1910 and the interface circuit 1920 are coupled to each other. It may be understood that the interface circuit 1920 may be a transceiver or an input/output interface. Optionally, the communication apparatus 1900 may further include a memory 1930, configured to: store instructions executed by the processor 1910, or store input data required by the processor 1910 to run the instructions, or store data generated after the processor 1910 runs the instructions.

When the communication apparatus 1900 is configured to implement the method shown in FIG. 10, the processor 1910 is configured to implement a function of the processing unit 1810, and the interface circuit 1920 is configured to implement a function of the transceiver unit 1820.

When the communication apparatus is a chip used in a terminal device, the chip in the terminal device implements functions of the terminal device in the foregoing method embodiments. The chip in the terminal device receives information from another module (for example, a radio frequency module or an antenna) in the terminal device. The information is sent by a network device to the terminal device. Alternatively, the chip in the terminal device sends information to another module (for example, a radio frequency module or an antenna) in the terminal device. The information is sent by the terminal device to a network device.

When the communication apparatus is a chip used in a network device, the chip in the network device implements functions of the network device in the foregoing method embodiments. The chip in the network device receives information from another module (for example, a radio frequency module or an antenna) in the network device. The information is sent by a terminal device to the network device. Alternatively, the chip in the network device sends information to another module (for example, a radio frequency module or an antenna) in the network device. The information is sent by the network device to a terminal device.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in a network device or a terminal device. Certainly, the processor and the storage medium may exist in the network device or the terminal device as discrete components.

All or a part of the foregoing embodiments may be implemented by software, hardware, firmware, or any combination thereof. When software is used to implement the foregoing embodiments, all or a part of the foregoing embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by a computer, or a data storage device, such as a server, a data center, or the like, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. "And/Or" is an association relationship for describing associated objects, and represents that three relationships may exist. For example, A and/or B may represent the following cases: Only A exists, both A and B exist, and only B exists, where A and B may be in a singular form or a plural form. In the text descriptions of this application, the character "/" generally indicates an "or" relationship between the associated objects. In a formula in this application, the character "/" indicates a "division" relationship between the associated objects.

It may be understood that numerical symbols involved in embodiments of this application are differentiated merely for ease of description, but are not used to limit the scope of embodiments of this application. The sequence numbers of the foregoing processes do not mean execution sequences, and the execution sequences of the processes should be determined based on functions and internal logic of the processes.

What is claimed is:

1. A communication method, comprising:
detecting a first common signal, wherein the first common signal belongs to a first set, and the first set comprises at least two common signals having different frequency positions, and the first common signal carries first indication information, wherein the first indication information indicates a frequency domain position of the first common signal and a first frequency offset;
determining a frequency domain position of a first control resource based on the frequency domain position of the first common signal and the first frequency offset indicated by the first indication information; and
receiving first downlink control information (DCI) on the first control resource, wherein the first DCI is used to schedule a system message.

2. The communication method according to claim 1, wherein
the first indication information indicates a frequency domain position of the first common signal and a first frequency offset; and
the determining the first control resource based on the first indication information comprises:
determining a frequency domain position of a reference common signal based on the frequency domain position of the first common signal, wherein the first set comprises the reference common signal; and
determining a frequency domain position of the first control resource based on the frequency domain position of the reference common signal and the first frequency offset.

3. The communication method according to claim 2, wherein
the first indication information further indicates an index of the first common signal in the first set; and
the determining the frequency domain position of the reference common signal based on the frequency domain position of the first common signal comprises:
determining the frequency domain position of the reference common signal based on the frequency domain position of the first common signal, the index of the first common signal in the first set, an index of the reference common signal in the first set, and a pattern of the first set.

4. The communication method according to claim 3, further comprising:

obtaining first information, wherein the first information indicates an index of the pattern of the first set, wherein the pattern of the first set defines a time-frequency position of each common signal in the first set and an index of each common signal in the first set.

5. The communication method according to claim 1, wherein the first common signal comprises a synchronization signal and a physical broadcast channel, and the first indication information is carried in a master information block transmitted on the physical broadcast channel.

6. The communication method according to claim 1, further comprising:

obtaining first information indicating an index of a pattern of the first set, wherein the pattern of the first set defines relative time-frequency positions of each common signal in the first set within a time domain periodicity and a frequency domain unit; and determining the frequency domain position of the first common signal based on a detected time-frequency position of the first common signal and the pattern of the first set.

7. A communication method, comprising:

sending a first common signal, wherein the first common signal belongs to a first set, the first set comprises at least two common signals having different frequency positions, the first common signal carries first indication information, wherein the first indication information indicates a frequency domain position of the first common signal and a first frequency offset, and the first indication information is used to determine a frequency domain position of a first control resource based on the frequency domain position of the first common signal and the first frequency offset; and sending first downlink control information (DCI) on the first control resource, wherein the first DCI is used to schedule a system message.

8. The communication method according to claim 7, further comprising:

sending a second common signal, wherein the second common signal belongs to the first set, a frequency position of the second common signal is different from the frequency position of the first common signal, the second common signal comprises second indication information, and the second indication information is used to determine a second control resource;

the second indication information indicates a frequency domain position of the second common signal and a second frequency offset; and the first frequency offset is different from the second frequency offset.

9. The communication method according to claim 7, wherein the first indication information indicates a time domain position of the first common signal and a first time offset.

10. The communication method according to claim 9, further comprising:

sending a third common signal, wherein the third common signal belongs to the first set, a time domain position of the third common signal is identical to the time domain position of the first common signal, the third common signal comprises third indication information, and the third indication information is used to determine a third control resource;

the third indication information indicates the time domain position of the third common signal and a third time offset; and the first time offset is different from the third time offset.

11. A communication apparatus, comprising:

at least one processor; and a memory having instructions stored thereon that, when executed by the at least one processor, the communication apparatus to:

detect a first common signal, wherein the first common signal belongs to a first set, and the first set comprises at least two common signals having different frequency positions, and the first common signal carries first indication information, wherein the first indication information indicates a frequency domain position of the first common signal and a first frequency offset;

determine a frequency domain position of a first control resource based on the frequency domain position of the first common signal and the first frequency offset indicated by the first indication information; and receive first downlink control information (DCI) on the first control resource, wherein the first DCI is used to schedule a system message.

12. The communication apparatus according to claim 11, wherein the first indication information indicates a frequency domain position of the first common signal and a first frequency offset; and the communication apparatus is further caused to:

determine a frequency domain position of a reference common signal based on the frequency domain position of the first common signal, wherein the first set comprises the reference common signal; and determine a frequency domain position of the first control resource based on the frequency domain position of the reference common signal and the first frequency offset.

13. The communication apparatus according to claim 12, wherein the first indication information further indicates an index of the first common signal in the first set; and the communication apparatus is further caused to:

determine the frequency domain position of the reference common signal based on the frequency domain position of the first common signal, the index of the first common signal in the first set, an index of the reference common signal in the first set, and a pattern of the first set.

14. The communication apparatus according to claim 13, wherein the communication apparatus is further caused to:

obtain first information, wherein the first information indicates an index of the pattern of the first set, and the pattern of the first set defines a time-frequency position of each common signal in the first set and an index of each common signal in the first set.

15. The communication apparatus according to claim 11, wherein the first set comprises a plurality of common signals transmitted with different beam directions, and wherein control resources corresponding to the plurality of common signals have different frequency domain positions to enable transmission of the first DCI with different beams.

16. The communication apparatus according to claim 11, wherein the communication apparatus is further caused to:

obtain first information indicating an index of a pattern of the first set, wherein the pattern of the first set defines relative time-frequency positions of each common signal in the first set within a time domain periodicity and a frequency domain unit; and determine the frequency domain position of the first common signal based on a detected time-frequency position of the first common signal and the pattern of the first set.

17. A communication apparatus, comprising:

at least one processor; and a memory having instructions stored thereon that, when executed by the at least one processor, the communication apparatus to:

send a first common signal, wherein the first common signal belongs to a first set, the first set comprises at least two common signals having different frequency positions, the first common signal carries first indication information, wherein the first indication information indicates a frequency domain position of the first common signal and a first frequency offset, and the first indication information is used to determine a frequency domain position of a first control resource based on the frequency domain position of the first common signal and the first frequency offset; and send first downlink control information (DCI) on the first control resource, wherein the first DCI is used to schedule a system message.

18. The communication apparatus according to claim 17, wherein the communication apparatus is further caused to:

send a second common signal, wherein the second common signal belongs to the first set, a frequency position of the second common signal is different from the frequency position of the first common signal, the second common signal comprises second indication information, and the second indication information is used to determine a second control resource;

the second indication information indicates a frequency domain position of the second common signal and a second frequency offset; and the first frequency offset is different from the second frequency offset.

19. The communication apparatus according to claim 17, wherein the first indication information indicates a time domain position of the first common signal and a first time offset.

20. The communication apparatus according to claim 19, wherein the communication apparatus is further caused to:

send a third common signal, wherein the third common signal belongs to the first set, a time domain position of the third common signal is identical to the time domain position of the first common signal, the third common signal comprises third indication information, and the third indication information is used to determine a third control resource;

the third indication information indicates the time domain position of the third common signal and a third time offset; and the first time offset is different from the third time offset.

* * * * *